(12) United States Patent (10) Patent No.: US 12,169,626 B2
Zakharov et al. (45) Date of Patent: Dec. 17, 2024

(54) PROMPT MODIFICATION FOR AUTOMATED IMAGE GENERATION

(71) Applicant: Snap Inc., Santa Monica, CA (US)

(72) Inventors: Aleksandr Zakharov, Dubai (AE);
Sergey Smetanin, London (GB);
Arnab Ghosh, Oxford (GB); Pavel Savchenkov, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/116,003

(22) Filed: Mar. 1, 2023

(65) Prior Publication Data

US 2024/0295953 A1 Sep. 5, 2024

(51) Int. Cl.
*G06F 3/048* (2013.01)
*G06F 3/04845* (2022.01)
*G06T 11/00* (2006.01)
*G06F 40/12* (2020.01)

(52) U.S. Cl.
CPC .......... *G06F 3/04845* (2013.01); *G06T 11/00* (2013.01); *G06F 40/12* (2020.01); *G06T 2200/24* (2013.01)

(58) Field of Classification Search
CPC ...... G06F 3/04845; G06F 40/12; G06T 11/00; G06T 2200/24
See application file for complete search history.

(56) References Cited

U.S. PATENT DOCUMENTS

| | | | |
|---|---|---|---|
| 7,214,065 B2 * | 5/2007 | Fitzsimmons, Jr. ... | G09B 19/00 434/236 |
| 8,867,849 B1 | 10/2014 | Kirkham et al. | |
| 10,496,924 B1 * | 12/2019 | Highnam ............ | H04L 63/1483 |
| 11,445,148 B1 | 9/2022 | Øhrn | |
| 11,809,688 B1 | 11/2023 | Parasnis et al. | |
| 11,947,893 B1 | 4/2024 | Seth | |

(Continued)

FOREIGN PATENT DOCUMENTS

| | | |
|---|---|---|
| CN | 115391588 A | 11/2022 |
| EP | 3698258 A1 | 8/2020 |

OTHER PUBLICATIONS

Li, Junnan, "BLIP: Bootstrapping Language-Image Pre-training for Unified Vision-Language Understanding and Generation", arXiv: 2201.12086v2 [cs.CV], (Feb. 15, 2022), 12 pgs.

Schuhmann, Christoph, "CLIP+MLP Aesthetic Score Predictor", [Online] Retrieved from the Internet: <URL: https://github.com/christophschuhmann/improved-aesthetic-predictor>, (Jun. 30, 2022), 2 pgs.

(Continued)

*Primary Examiner* — David E Choi
(74) *Attorney, Agent, or Firm* — SCHWEGMAN LUNDBERG & WOESSNER, P.A.

(57) ABSTRACT

Examples disclosed herein describe prompt modification techniques for automated image generation. An image generation request comprising a base prompt is received from a user device. A plurality of prompt modifiers is identified. A processor-implemented scoring engine determines, for each prompt modifier, a modifier score. The modifier score for each prompt modifier is associated with the base prompt. One or more of the prompt modifiers are automatically selected based on the modifier scores. A modified prompt is generated. The modified prompt is based on the base prompt and the one or more selected prompt modifiers. The modified prompt is provided as input to an automated image generator to generate an image, and the image is caused to be presented on the user device.

20 Claims, 13 Drawing Sheets

(56) References Cited

U.S. PATENT DOCUMENTS

| | | |
|---|---|---|
| 2014/0051402 A1 | 2/2014 | Qureshi |
| 2014/0344712 A1 | 11/2014 | Okazawa et al. |
| 2016/0188153 A1 | 6/2016 | Lerner et al. |
| 2020/0267182 A1* | 8/2020 | Highnam ............ H04L 63/0236 |
| 2021/0042796 A1* | 2/2021 | Khoury ................ G06Q 10/103 |
| 2021/0209184 A1 | 7/2021 | Huang et al. |
| 2021/0352460 A1 | 11/2021 | Rohde et al. |
| 2022/0036153 A1 | 2/2022 | O'Malia et al. |
| 2022/0101578 A1* | 3/2022 | Bedi ....................... G06T 11/00 |
| 2022/0114698 A1* | 4/2022 | Liu .......................... G06T 3/04 |
| 2023/0025835 A1* | 1/2023 | Moriya ................ G06Q 10/103 |
| 2023/0054174 A1* | 2/2023 | Peled .................... G06F 3/0481 |
| 2023/0177878 A1* | 6/2023 | Sekar ...................... G06F 40/40 382/103 |
| 2023/0215441 A1* | 7/2023 | Wu ......................... G10L 17/22 704/232 |
| 2023/0222703 A1 | 7/2023 | Baheti et al. |
| 2023/0230198 A1* | 7/2023 | Zhang .................... G06N 3/047 382/276 |
| 2023/0260164 A1* | 8/2023 | Yuan ...................... G06N 20/00 382/157 |
| 2023/0262102 A1 | 8/2023 | Das et al. |
| 2023/0281789 A1* | 9/2023 | Sudarsky ................. G06T 1/60 382/128 |
| 2023/0298224 A1* | 9/2023 | Aggarwal ........... G06F 16/5838 382/162 |
| 2023/0342284 A1* | 10/2023 | Easton ................ G06F 11/3457 |
| 2024/0135610 A1 | 4/2024 | Kolkin et al. |
| 2024/0169622 A1 | 5/2024 | Xie et al. |
| 2024/0193821 A1 | 6/2024 | Denison |

OTHER PUBLICATIONS

Vincent, James, "TikTok Now Offers A Very Basic Text-To-Image AI Generator Directly In The App", The Verge, (Aug. 15, 2022), 4 pgs.

U.S. Appl. No. 18/115,997, filed Mar. 1, 2023, Aspect Ratio Conversion for Automated Image Generation.

U.S. Appl. No. 18/176,843, filed Mar. 1, 2023, Automatic Image Quality Evaluation.

U.S. Appl. No. 18/176,971, filed Mar. 1, 2023, Automatic Image Generation in an Interaction System.

"U.S. Appl. No. 18/176,971, Response filed Mar. 15, 2024 to Non Final Office Action mailed Dec. 19, 2023", 13 pgs.

"AI Prompt Art Maker Generator", Emoji World, [Online]. Retrieved from the Internet: <https://apps.apple.com/us/app/ai-prompt-art-maker-generator/id6444807049>, (Dec. 6, 2022), 5 pgs.

"U.S. Appl. No. 18/176,971, Non Final Office Action mailed Dec. 19, 2023", 19 pgs.

"Midjourney Banned Words: Understanding the AI image Generator's Restrictions", [Online]. Retrieved from the Internet: <https://midjourney.co.in/midjourney-banned-words-understanding-the-ai-image-generators-restrictions/>, (Feb. 24, 2023), 9 pgs.

Palli, Praneeth, "Want To Change Wallpaper For A Specific Chat On WhatsApp? Follow These Steps", [Online]. Retrieved from the Internet: <https://in.mashable.com/tech/31833/want-to-change-wallpaper-for-a-specific-chat-on-whatsapp-follow-these-steps>, (May 17, 2022), 6 pgs.

"U.S. Appl. No. 18/176,971, Notice of Allowance mailed Jun. 3, 2024", 6 pgs.

"International Application Serial No. PCT/US2024/016223, International Search Report mailed Jun. 18, 2024", 4 pgs.

"International Application Serial No. PCT/US2024/016223, Written Opinion mailed Jun. 18, 2024", 7 pgs.

"International Application Serial No. PCT/US2024/016539, International Search Report mailed May 31, 2024", 3 pgs.

"International Application Serial No. PCT/US2024/016539, Written Opinion mailed May 31, 2024", 5 pgs.

"International Application Serial No. PCT/US2024/017140, International Search Report mailed May 28, 2024", 4 pgs.

"International Application Serial No. PCT/US2024/017140, Written Opinion mailed May 28, 2024", 5 pgs.

"International Application Serial No. PCT/US2024/017545, International Search Report mailed Jun. 7, 2024", 3 pgs.

"International Application Serial No. PCT/US2024/017545, Written Opinion mailed Jun. 7, 2024", 7 pgs.

Chen, Shoufa, et al., "DiffusionDet: Diffusion Model for Object Detection", ARXIV.ORG, Cornell University Library, 201, Olin Library Cornell University Ithaca, NY 1485, (Nov. 17, 2022), 16 pgs.

Cheng, Jiaxin, et al., "LayoutDiffuse: Adapting Foundational Diffusion Models for Layout- to-Image Generation", ARXIV.ORG, Cornell University Library, 201 Olin Library Cornell University Ithaca, NY 14853, (Feb. 16, 2023), 15 pgs.

Dinh, Tan M., et al., "TISE: Bag of Metrics for Text - to - Image Synthesis Evaluation", ARXIV.ORG, Cornell University Library, 201 Olin Library Cornell University Ithaca, NY 14853, (Jul. 19, 2022), 34 pgs.

Gu, Shuyang, et al., "GIQA: Generated Image Quality Assessment", ARXIV.ORG, Cornell University Library, 201 Olin Library Cornell University Ithaca, NY 14853, (Mar. 19, 2020), 26 pgs.

Hao, Yaru, et al., "Optimizing Prompts for Text-to-Image Generation", ARXIV.ORG, Cornell University Library, 201 Olin Library Cornell University Ithaca, NY 14853, (Dec. 19, 2022), 16 pgs.

Li, Yuheng, et al., "GLIGEN: Open-Set Grounded Text-to-Image Generation", ARXIV.ORG, Cornell University Library, 201, Olin Library Cornell University Ithaca, NY, 14853, (Jan. 17, 2023), 21 pgs.

Oppenlaender, Jonas, "A taxonomy of prompt modifiers for text-to-image generation", arXiv preprint arXiv:2204.13988v2., (Jul. 31, 2022), 18 pgs.

Yu, Wenxin, et al., "Blind Image Quality Assessment for a Single Image From Text to Image Synthesis", IEEE Access, IEEE, USA, vol. 9, (Jul. 1, 2021), 12 pgs.

"U.S. Appl. No. 18/176,971, Notice of Allowance mailed Sep. 17, 2024", 6 pgs.

* cited by examiner

PROMPT MODIFICATION FOR AUTOMATED IMAGE GENERATION

TECHNICAL FIELD

The subject matter disclosed herein relates to automated image generation, and particularly, but not exclusively, to systems including text-to-image models that utilize prompts for automated image generation.

BACKGROUND

The field of automated image generation, including artificial intelligence-driven image generation, continues to grow. Machine learning models known as text-to-image models can be trained to analyze natural language descriptions (referred to herein as "prompts") and automatically generate corresponding visual outputs. This process can be referred to as automatic, text-guided image generation.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
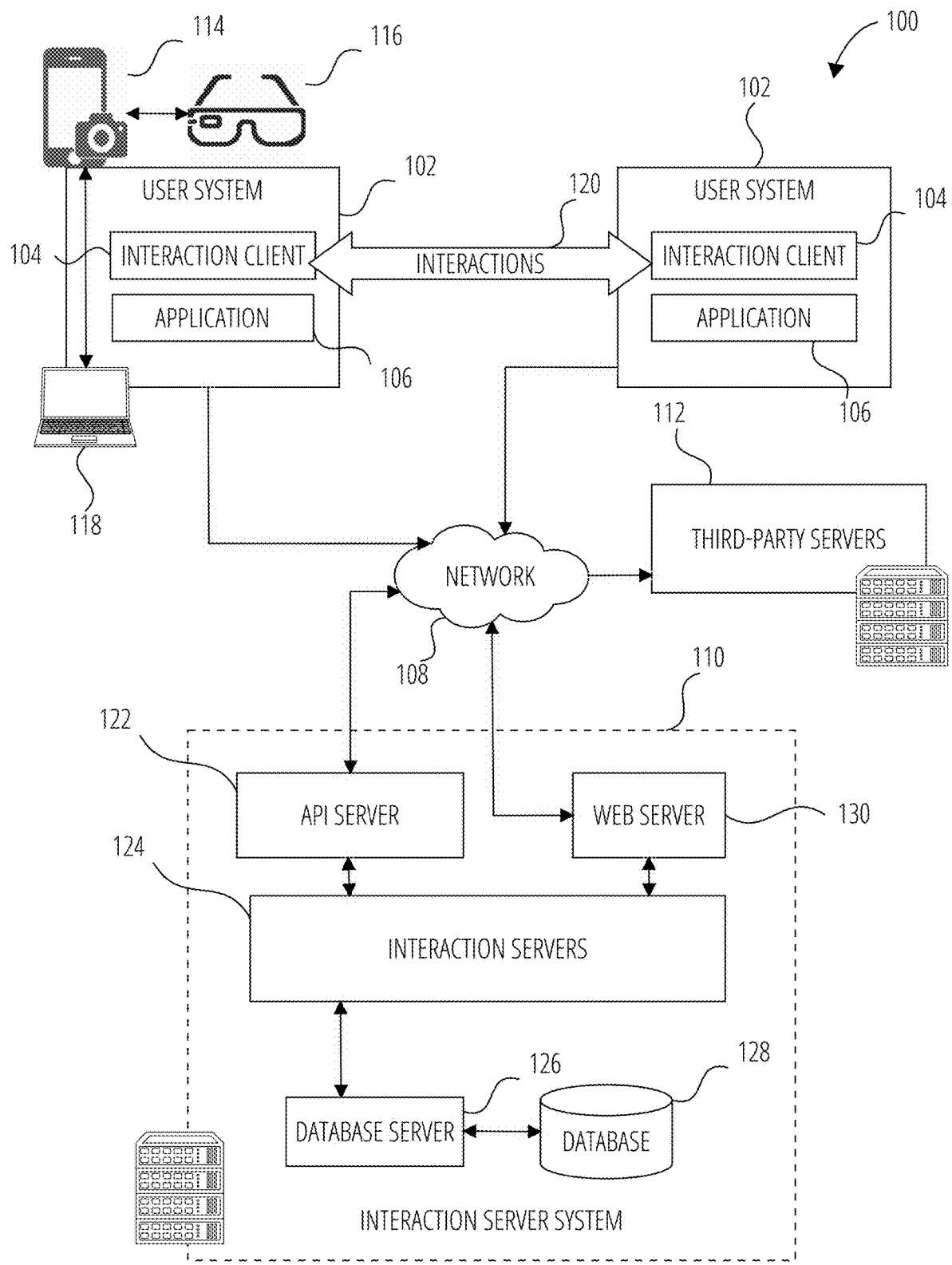
FIG. 1 is a diagrammatic representation of a networked environment in which the present disclosure may be deployed, according to some examples.

Automated image generators utilizing text-to-image technology, e.g., generators built on diffusion models or Generative Adversarial Networks (GANs), may be able to generate high-fidelity images in response to a user's prompts. Several metrics can be used to evaluate the quality of an image generated by an automated image generator. For example, it may be desirable not only for the image to be of satisfactory visual (e.g., aesthetic) quality, but also to achieve a high level of alignment between the image and the original prompt.

The preparation, selection, or refinement of effective prompts to guide the output of an automated image generator is referred to herein as "prompt engineering." Prompt engineering is a notable aspect of automated image generation, because the quality of an output image can vary depending on the specific text included in a prompt. For example, the inclusion of certain keywords in a prompt may significantly improve the quality of an output image. A lack of prompt engineering skills or experience, or difficulties in applying prompt engineering techniques, may therefore create technical hurdles to the generation of useful images.

Examples of the present disclosure allow users to have high-quality images automatically generated for them using an automated image generator, without requiring sophisticated prompt engineering skills. A prompt augmentation system is provided, enabling a user's original prompt to be automatically augmented (or otherwise modified) in such a manner that output image quality may be improved compared to an image that would have been generated based on the original prompt.

In some examples, a base prompt is provided by a user from a user device. For example, a user may input a text prompt comprising multiple words describing a desired image into an input text box provided by an application's user interface. A processor-implemented scoring engine then determines, for each of a plurality of possible prompt modifiers, a modifier score. The scoring engine may include a text encoder that encodes input text to allow for processing of the encoded text by a scoring model, e.g., a neural network.

In some examples, one or more of the prompt modifiers are automatically selected based at least partially on the modifier scores. A modified prompt is generated based on the base prompt and the one or more selected prompt modifiers. For example, the modified prompt can include the base prompt with a set of modifiers in the form of additional words appended to the base prompt. The modified prompt may be determined to be likely to result in a higher quality image than an image that would have been generated using the base prompt alone. The modified prompt is provided as input to an automated image generator to generate the requested image.

Machine learning models according to examples described herein are trained to generate or predict scores associated with prompt modifiers. For example, a neural network may be trained to predict, for a specific prompt-modifier pair, the difference between an image quality score for an image generated using the prompt alone, and the image quality score for an image generated using the prompt together with the modifier. A neural network may alternatively (or additionally) be trained to predict changes in image quality scores or modifier scores for different combinations of text objects. In some examples, a predefined number of top modifiers are added to a base prompt to define a modified prompt. Systems described herein may iteratively add modifiers to a prompt and score each iteration in order to obtain a modified prompt that is likely to improve output image quality.

Examples described herein may address or alleviate technical problems associated with obtaining images of a desired quality using text-guided image generation. An example technical problem of improving image quality without requiring additional, manual user input may be addressed by automatically modifying or augmenting user prompts using techniques described herein. Another example technical problem of improving the relevancy of automatically generated images may be addressed through modifier scoring techniques described herein. Examples described herein may also result in more efficient computing resource usage, e.g., by reducing the number of images that need to be generated for a user to reach a satisfactory result.

As used in this disclosure, the term "text object" refers to any character or sequence of characters. A text object may thus include letters, numbers, punctuation, and other symbols. A text object can represent a single character, a word, or a longer string of text. In some examples, a prompt modifier utilized to create a modified prompt includes one or more text objects.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
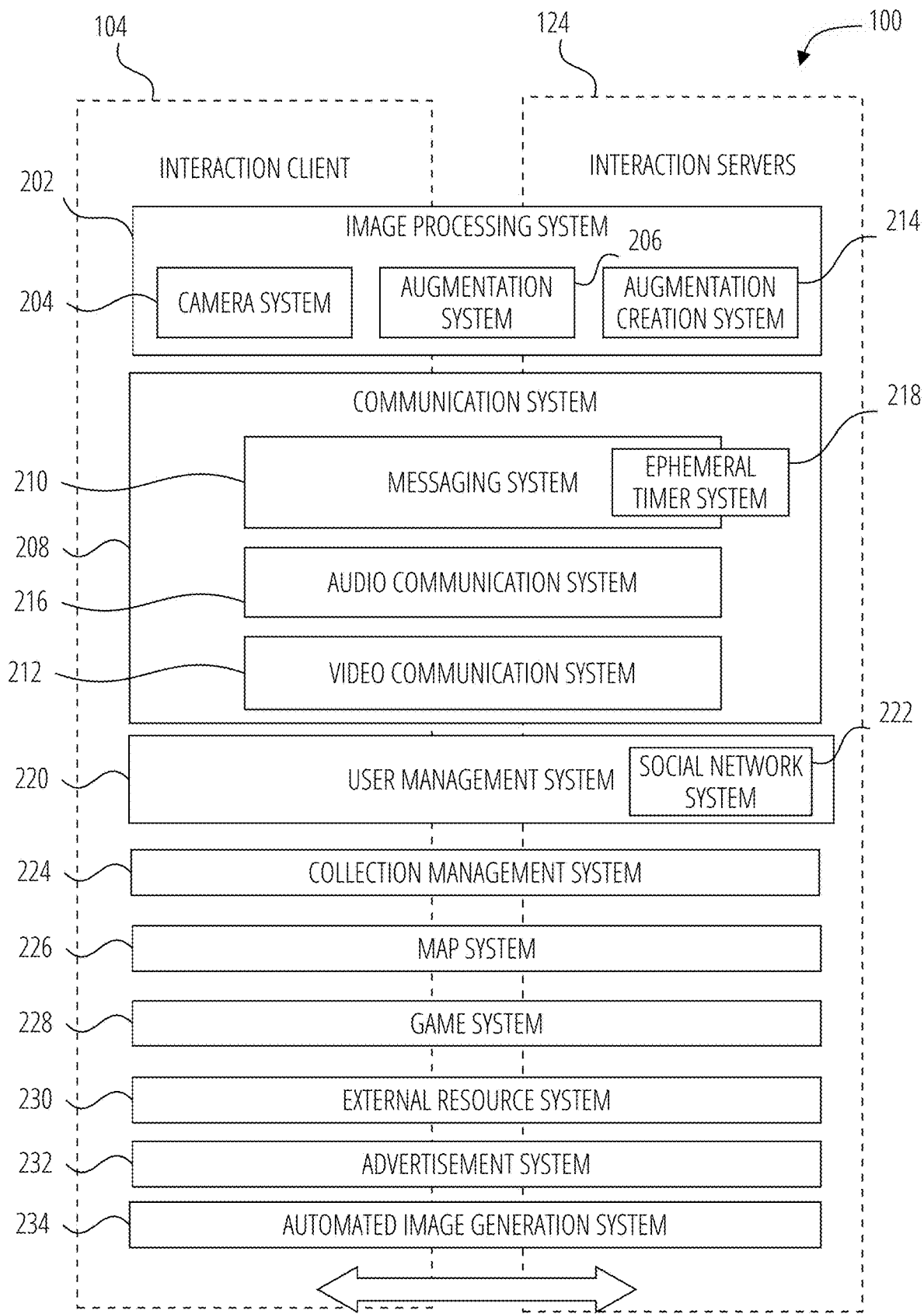
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1102 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

An automated image generation system 234 enables a user to submit a prompt via the interaction client 104. In response, the automated image generation system 234 causes the generation of an image corresponding to the prompt. This can be referred to as a text-guided automatic image generation feature. For example, the automated image generation system 234 may include an automated image generator including a text-to-image machine learning model, or be communicatively coupled to a third-party automated image generator.

The automated image generation system 234 is further responsible for applying various automated prompt modification techniques. For example, the automated image generation system 234 may augment a user's prompt (e.g., add specific keywords to the prompt, or otherwise modify the prompt to create a revised version thereof) before the prompt is fed to the automated image generator. This process may be carried out, for example, to increase the likelihood that an image generated by the automated image generator will be of high quality (or a higher quality than would have been obtained using the user's original prompt). The term "quality" may be defined in various ways, depending on the use case and/or implementation, and an improvement in quality may include increasing the likelihood of alignment between a text prompt and the content of the image, increasing the likelihood of obtaining a high aesthetic quality in the image, or improving other parameters such as visual realism, as described further below. To this end, the automated image generation system 234 may include one or more machine learning models trained to score, predict and/or select appropriate prompt modifiers for a particular input prompt, referred to in some examples as a "base prompt," as described further below.

Data Architecture

Figure 3:
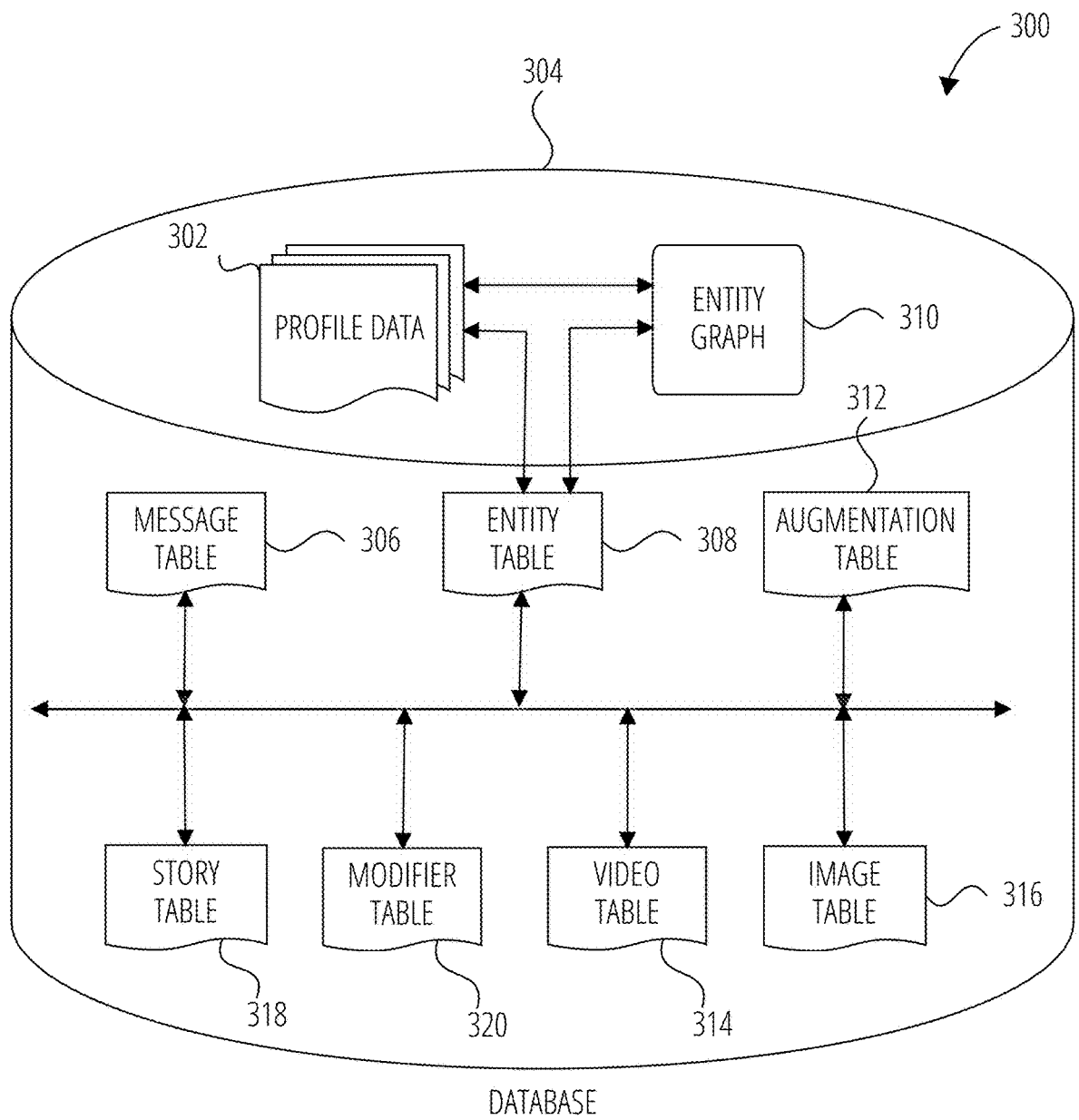
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 10.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314. The image table 316 may further store image data associated with images generated by or via the automated image generation system 234.

The modifier table 320 stores a predefined set of prompt modifiers used by the automated image generation system 234 in the modification of prompts, according to some examples. The predefined set of prompt modifiers may be a set of modifiers that a processor-implemented scoring engine of the automated image generation system 234 has been specifically trained on such that the scoring engine is able to generate or predict, for a given base prompt, one or more suitable modifiers to add to the base prompt. The modifier table 320 may also include scoring model data, scoring algorithm data and other data used by the automated image generation system 234 in scoring and selecting modifiers, or scoring and selecting candidate modified prompts. Further, the modifier table 320 may store historic data relating to user prompts and modifications applied thereto.

Figure 4:
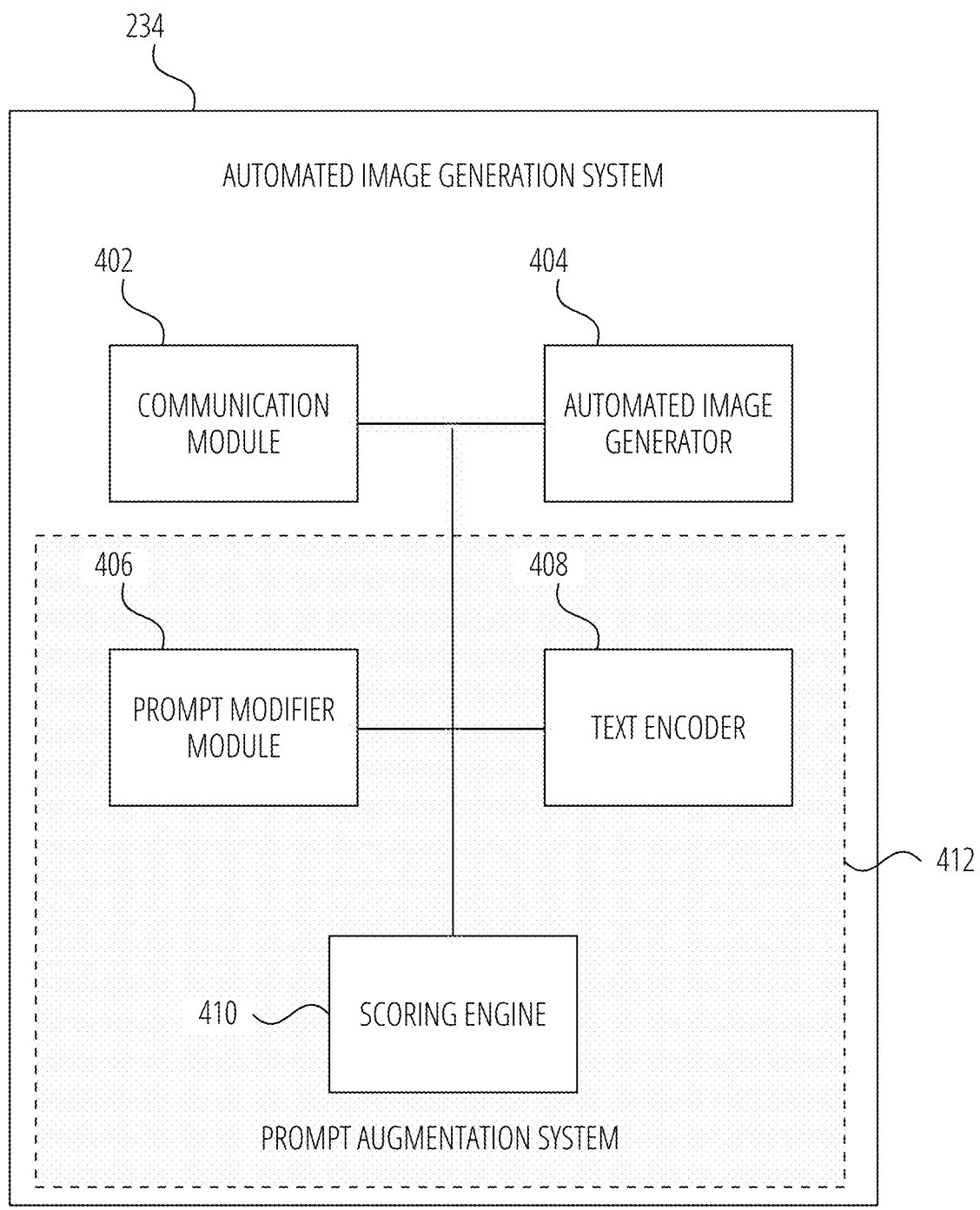
FIG. 4 is a block diagram illustrating components of an automated image generation system, according to some examples.

FIG. 4 is a block diagram illustrating components of the automated image generation system 234, according to some examples. Any one or more of the modules (which may also be referred to as components) described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices. Also, while the automated image generation system 234 is shown in examples as being part of an interaction system such as the interaction system 100, in other examples the automated image generation system 234 can form part of other systems, such as content generation systems or content editing systems that may not necessarily provide user interaction features as described with reference to the interaction system 100.

Turning now specifically to FIG. 4, the automated image generation system 234 includes a communication module 402, an automated image generator 404, a prompt modifier module 406, a processor-implemented text encoder 408, and a processor-implemented scoring engine 410. The communication module 402 is responsible for enabling the automated image generation system 234 to access data such as prompts and other input provided by a user (e.g., via a mobile device 114), and for transmitting data such as output images to be provided to the user. The communication module 402 may receive a base prompt originating from a user via a text input box in a user interface. In some examples, the user is restricted to providing no more than a maximum number of characters, e.g., 150 characters, or 400 characters, in a base prompt.

The automated image generation system 234 may be configured to prohibit the user from generating sensitive, objectionable or unwanted content. Accordingly, a prompt containing sensitive, objectionable, or unwanted text may be rejected and/or modified prior to image generation. Rejection and/or modification may be carried out by the automated image generation system 234 automatically. To this end, the automated image generation system 234 may include a processor-implemented content moderation engine. Prior to feeding the prompt to the automated image generator 404, the content moderation engine may analyze the prompt to check for objectionable text objects. The content moderation engine may be configured to check for specific words or phrases that are not allowable, or may implement a machine learning model that is trained to predict whether a text prompt may include objectionable content, or may lead to objectionable visual output (e.g., based on a predicted meaning or context of the relevant words). In some examples, the content moderation engine automatically scans an incoming prompt using both machine learning techniques, e.g., to predict a meaning or content, and rule-based checks, e.g., to check for specific words that are not allowed in a prompt. Prompts containing unwanted text objects, or with a context or meaning that is determined to be objectionable, may be referred to as "restricted prompts." Restricted prompts may be rejected and/or modified prior to image generation, as described further below.

The content moderation engine may use various techniques to detect potentially problematic or objectionable content, such as natural language processing, sentiment analysis, and image recognition. For example, the content moderation engine may analyze a prompt that includes text referring to violence, hate speech, or explicit sexual content. The content moderation engine may also detect patterns of behavior or user history that suggest a likelihood of generating objectionable content and use machine learning algorithms to continuously improve its ability to detect objectionable content.

Once objectionable content is detected and a prompt is thus determined to be a "restricted prompt," the content moderation engine may take different actions, depending, for example, on the severity of the content. For instance, the content moderation engine may reject the entire input prompt or modify it by replacing specific words or phrases with more appropriate ones. In other words, the restricted prompt may be adapted such that it is no longer classified as "restricted," and the adapted prompt can be passed to the automated image generator 404.

In some examples, certain processes are performed by external components (external to the interaction system 100), and the communication module 402 may communicate with these external components. For example, image generation may be provided by a third-party or other external automated image generator instead of the automated image generator 404, and the communication module 402 may facilitate communications to and from the external automated image generator. The communication module 402 may also communicate with the database 128 of the interaction system 100.

In some examples, and as shown in FIG. 4, the automated image generator 404 forms part of the automated image generation system 234. The automated image generator 404 comprises a text-to-image machine learning model in the example form of a diffusion model.

A diffusion model is a type of generative machine learning model that can be used to generate images from a given text prompt. It is based on the concept of "diffusing" noise throughout an image to transform it gradually into a new image. A diffusion model may use a sequence of invertible transformations to transform a random noise image into a final image. During training, a diffusion model may learn sequences of transformations that can best transform random noise images into desired output images. A diffusion model is fed with input data (e.g., a text prompt describing the desired image) and the corresponding output images, and the parameters of the model are adjusted iteratively to improve the model's ability to generate accurate images.

Once trained, in order to generate an image, the model uses a text prompt as input and applies the trained sequence of transformations to generate an output image. The model generates the image in a step-by-step manner, with each step updating the image with additional information until the image is fully generated. This process may be repeated to produce a set of candidate images, from which the final image is chosen based on criteria such as a likelihood score. The resulting image is intended to represent a visual interpretation of the text prompt.

While the automated image generator 404 described herein utilizes a diffusion model to generate images, in some examples, other types of models may be employed to generate images, such as GANs, Variational Autoencoders (VAEs), autoregressive models, or other neural networks.

The prompt modifier module 406, the text encoder 408, and the scoring engine 410 together define a prompt augmentation system 412. The prompt augmentation system 412 receives a prompt originating from a user device, e.g., input by a user via the interaction client 104 on a mobile device 114 (via the communication module 402), and performs a modification process to generate a modified prompt. The modified prompt is then fed to the automated image generator 404 for generating the image in response to the user's request.

The prompt modifier module 406 accesses a predefined set of prompt modifiers and is configured to provide the base prompt, modifiers, and, in some examples, candidate modified prompts to the text encoder 408 and/or scoring engine 410 for processing. The text encoder 408 may be provided by a transformer-based deep neural network 602 responsible for encoding text into vector representations, referred to as embeddings. An example of such a transformer-based neural network is a CLIP (Contrastive Language-Image Pre-Training) text encoder. A CLIP model is based on a transformer architecture, and may include an encoder and a projector. The encoder component of the model takes text inputs and automatically generates fixed-length representations of the text.

The scoring engine 410 receives encoded data from the text encoder 408 (e.g., embeddings of text input) and automatically generates scores to be used in prompt modifier selection. In some examples, the scoring engine 410 generates a modifier score for each modifier. The modifier score may be indicative of a predicted image quality or indicative of a predicted difference in image quality resulting from use of one or more prompt modifiers. The scoring engine 410 may also generate an image quality score for the base prompt and use the image quality score to determine predictions for quality changes associated with various prompt modifiers.

Figure 6:
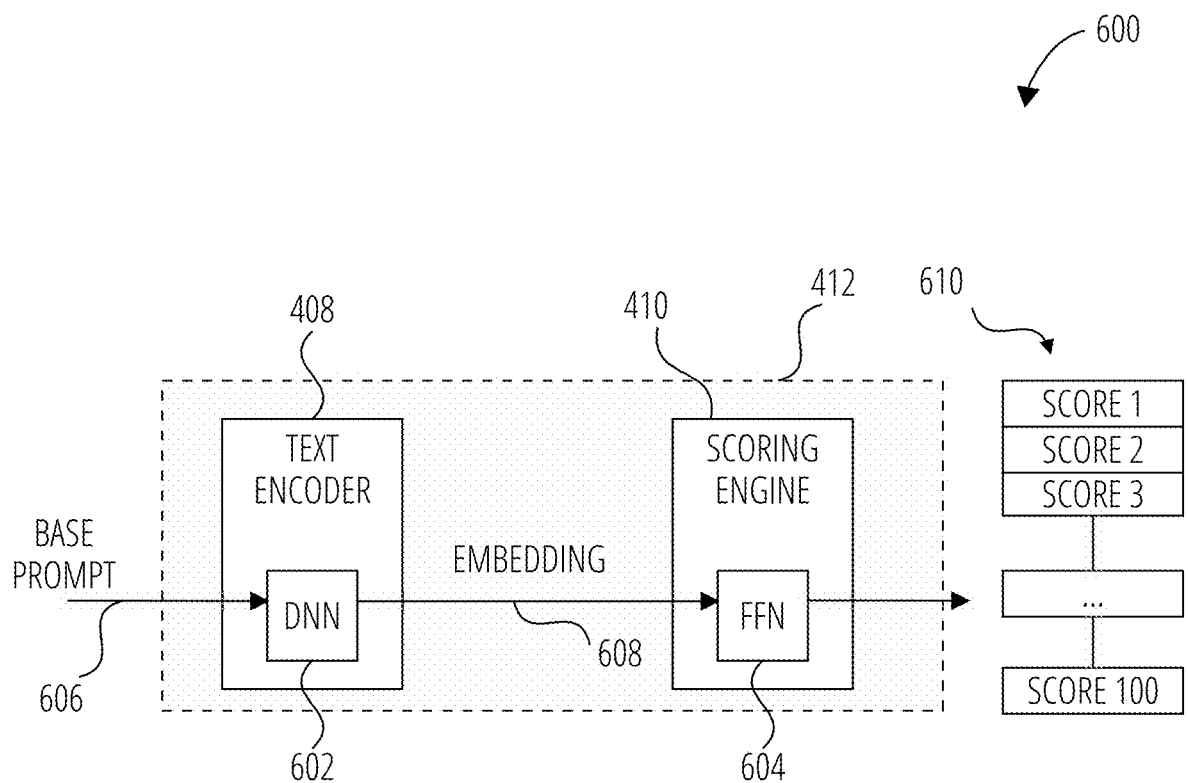
FIG. 6 is a diagrammatic representation of aspects of a modifier scoring process, according to some examples.
Figure 7:
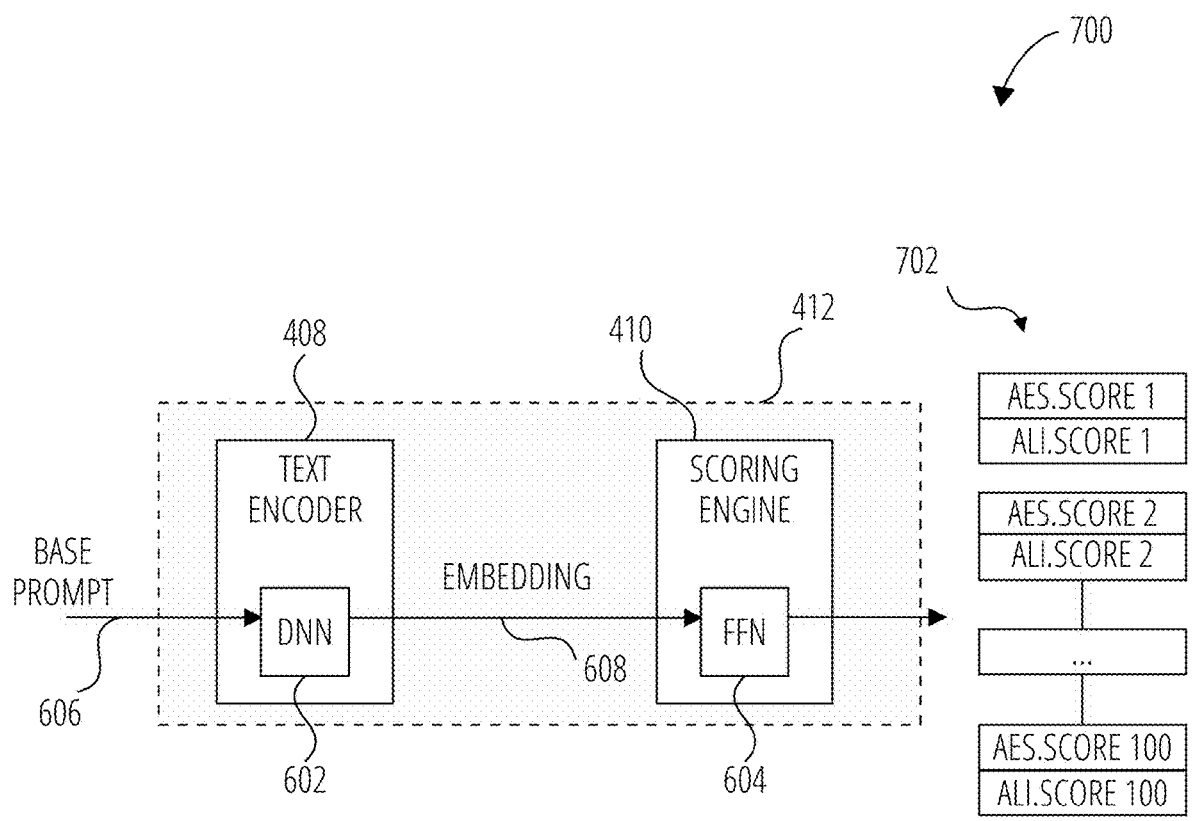
FIG. 7 is a diagrammatic representation of aspects of a modifier scoring process, according to some examples.
Figure 8:
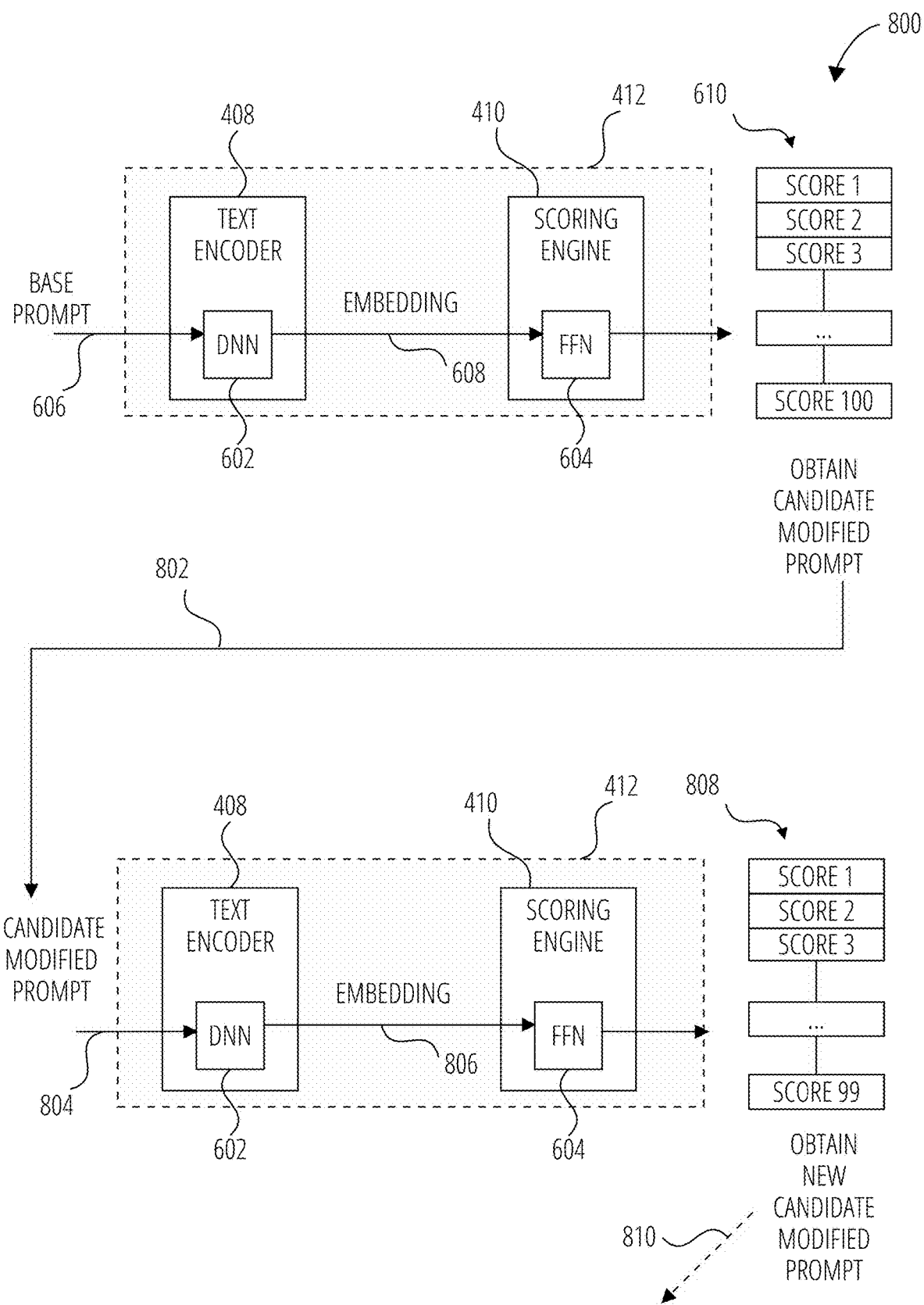
FIG. 8 is a diagrammatic representation of aspects of an iterative modifier scoring process, according to some examples.

In some examples, and as shown in FIG. 6, FIG. 7 and FIG. 8, the scoring engine 410 may provide a feedforward neural network (FFN) 604. Accordingly, a model, or models, implemented by the prompt augmentation system 412 may include an encoder such as the text encoder 408 with a network such as a lightweight FFN 604 over its embedding to predict scores associated with various modifiers. Scoring processes according to some examples are described in further detail below.

In order to train a model to provide scoring functionality as described in examples of the present disclosure, training data in the form of prompts, images, modifiers and metadata may be used. A training dataset may include thousands or millions of AI-generated images paired with the prompts that produced them. The training dataset may also include scores associated with training pairs (image-text pairs). For example, a given training pair may include a text prompt and a corresponding AI-generated image, as well as an aesthetic quality score for the image and an alignment score indicative of alignment between the text and the generated image.

In some examples, the training dataset may also include, for each image, a caption generated by an automated caption generator, such as an image-to-text model. These captions may be used to provide an indication of reverse alignment and can be used in the training process to train a model to predict reverse alignment scores. A caption can, for example, be automatically generated for an image using a multimodal encoder-decoder. The multimodal encoder-decoder may be based on a BLIP (Bootstrapping Language-Image Processing) model architecture which comprises the following functional components: a unimodal encoder, an image-grounded text encoder, and an image-grounded text decoder. The multimodal encoder-decoder module provides a unified model for vision-language understanding and generation. The multimodal encoder-decoder module can operate in one of three functionalities using its different functional components (the unimodal encoder, the image-grounded text encoder, or the image-grounded text decoder).

An initial dataset may be filtered to ensure that image-text pairs ultimately used in training are relevant to the application (use case) in question, e.g., 10,000 samples relating to the types of images to be generated by the automated image generation system 234 (and preferably generated by a similar generator, e.g., diffusion model) may be extracted from a larger dataset and used for training. Examples of use cases include the generation of background images for a user profile on a social networking platform, the generation of images to be inserted into a lifestyle blog, or the generation of landscape images in an artistic style. Filtering can be carried out, for example, by analyzing prompts that are typically used in the relevant use case and then extracting image-text pairs with text or metadata similar to those prompts.

A training dataset may also include a set of prompt modifiers. The modifiers may be a predefined set of modifiers determined to be relevant to the use case, or likely to improve image quality. Modifiers may also be obtained by filtering a larger dataset to obtain the most relevant, effective and/or frequently used modifiers. For example, a set of 200 modifiers may constitute the predefined set of prompt modifiers. The 200 modifiers (which is merely a non-limiting example) may be selected from a larger dataset based on various factors, such as relevancy, effectiveness, frequency of use in historic prompts, or generator type.

The text encoder 408 component may be trained on image-text pairs, e.g., using a combination of contrastive and supervised learning, to produce text embeddings that are semantically similar to corresponding image embeddings, allowing the model to associate the text and image representations with each other. Once trained, the text encoder 408 is then able to generate an embedding of text, e.g., as a fixed-length vector, to capture a meaning of the text, allowing the embedding to be used in downstream score predictions.

The scoring engine 410 component may be trained, e.g., using supervised learning, to predict image scores and/or differences in image scores resulting from the use of the abovementioned prompt modifiers. The neural network is trained on image-text pairs and their metadata, including scores or other indicators of image quality. To predict quality, e.g., aesthetic scores or alignment scores, a model may be trained to map image-text pairs to their corresponding scores by encoding both the images and text into a shared embedding space, and adjusting parameters to minimize the difference between the predicted and true ratings. To predict differences in quality/scores, for example, the dataset can include images generated with and without certain prompt modifiers, and the differences between the scores calculated for each of those images. These score differences are provided as an input to the model during training. The model then learns to predict these changes or differences in scores resulting from the use of different prompt modifiers. Accordingly, in some examples, a modifier score is indicative of a predicted change in an image quality score associated with the use of a prompt modifier.

In some examples, errors may be minimized by optimizing mean squared error loss. To this end, to achieve better quality for different types of scores (e.g., alignment, aesthetic, or others), loss for each type of score may be multiplied by its scale (standard deviation).

Further, in some examples, in order to train a model to first predict absolute scores (as opposed to first predicting score differences, or in addition thereto), and to have the ability to calculate differences in scores (associated with adding specified modifiers) after such a prediction, an "empty modifier" may be added such that scores are predicted for the base prompt alone.

Scores may include multiple components, such as a visual (e.g., aesthetic) component and an alignment component. For example, the model may be trained to take CLIP embeddings as input and predict a difference between an aesthetic score for images generated with and without a certain modifier (or modifiers), and further to predict a difference between an alignment score for the images generated with and with the certain modifier (or modifiers). Alignment scores may be based on a metric such as cosine similarity. A final score may be a combination of these components. For example, the model may be trained to predict the difference in aesthetic scores and then apply a penalty if the given modifier (or modifiers) is predicted to cause a reduction in alignment between the prompt and the image. In other examples, score components may be predicted and evaluated separately. Other scoring techniques may be used, such as a reverse alignment score or a visual realism score. It should, however, be appreciated that these scores and scoring techniques are examples and various evaluation systems may be employed to evaluate data and/or predict scores for prompt modifiers.

Accordingly, the deep neural network 602 may be trained to create the required text embeddings, and the FFN 604 may be trained to generate scores for a given text input in response to receiving an embedding corresponding to the given text input. The FFN 604 receives, as input, encoded data from the text encoder 408. The data is processed through a series of hidden layers, applying transformations and extracting features from the input data. An output layer produces the relevant prediction. The prediction may be the final score as required for a particular modifier or prompt-modifier combination, or may be further processed to arrive at the final score required to evaluate the relevant prompt modifiers.

As used in this disclosure, the term "score" refers to any suitable score or rating, e.g., a numerical score, a percentage-based score, or a grading. A score may also be provided in the form of a classification (e.g., "high aesthetic quality" or "medium aesthetic quality") or a range (e.g., 60%-75%). Scores may be generated using continuous (interval) scales, binary scales, or combinations thereof. Accordingly, it will be appreciated that numerous types of scores, grades, classifications, or the like may be employed.

As used in this disclosure, the term "aesthetic quality" refers to a measure or score indicating how visually appealing or pleasing an AI-generated image is to a human observer. It can be measured through subjective evaluation methods, such as surveys or human assessments, or through objective evaluation methods, such as using metrics such as Structural Similarity Index. Examples of automated techniques for assessing aesthetic quality are described herein. In some examples, an aesthetic quality score can be referred to as a visual realism score. In other examples, a visual realism score may be based on a different metric than a metric for aesthetic quality. For instance, visual realism may be based at least partially on whether an image contains artifacts.

As used in this disclosure, the term "alignment" refers to how well an AI-generated image corresponds to a given prompt, including, for example, how well the generated image captures the semantic and visual context of the prompt and/or how well it follows the intended category, context or style. It can be measured using human evaluation or through objective metrics such as distance metrics.

As used in this disclosure, the term "reverse alignment" refers to how well a caption, that was automatically generated for a given image using an automated caption generator (e.g., an image-to-text model), corresponds to the original prompt used to generate the given image. Reverse alignment can, for example, be calculated by encoding the caption and the original prompt and then comparing an embedding of the caption with that of the original prompt, e.g., by measuring cosine similarity.

Figure 5:
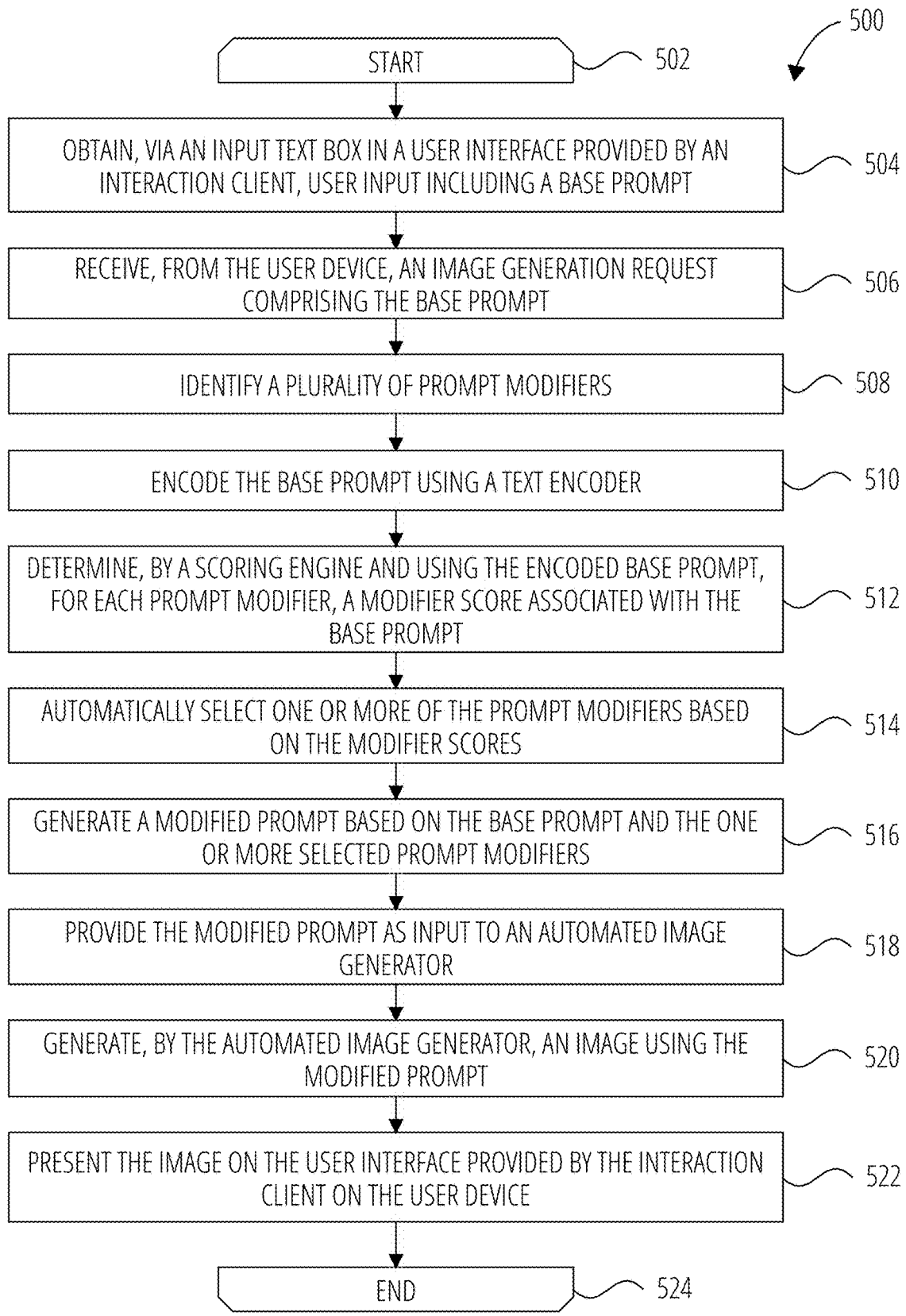
FIG. 5 is a flow diagram illustrating an automatic prompt modification process in an automated image generation system, according to some examples.

FIG. 5 is a flow diagram illustrating a method 500 for automatic prompt modification in an automated image generation system, according to some examples. The method 500 may be performed by components of the interaction system 100, including the automated image generation system 234.

The method 500 commences at opening loop block 502 and proceeds to block 504, where input is obtained from a user, e.g., via an input text box in a user interface provided by the interaction client 104. The user wishes to obtain an AI-generated image and provides user input describing the desired image. As mentioned above, the user may be restricted to typing a certain number of characters, e.g., 400 characters, into the input text box. The user may, for example, type "portrait of a snow viking," as will be described below with reference to Tables 1 and 2. The interaction system 100 receives an image generation request (block 506) and the user input that accompanies the request is designated as the base prompt.

Instead of using the base prompt directly as input to the automated image generator 404, the base prompt is fed to the prompt augmentation system 412 of the automated image generation system 234. The prompt augmentation system 412 is responsible for modifying the first set of text objects constituting the base prompt (e.g., "portrait of a snow viking") to enhance the likelihood of a high-quality image being returned by the automated image generator 404. The automated image generation system 234 may be configured to add a second set of text objects to the first set of text objects (e.g., append new text to the base prompt or include new text objects between text objects of the base prompt), modify text objects in the base prompt, remove text objects from the base prompt, or combinations thereof. In the examples described below with reference to FIG. 5 to FIG. 8, however, the automated image generation system 234 is configured only to add text to the base prompt (without removing or amending any of the original text objects).

The method 500 includes identifying a plurality of prompt modifiers, at block 508. The prompt modifier module 406 may access (e.g., from the database 128 or other storage component) and select the prompt modifiers from a predefined set of prompt modifiers, e.g., a set of 200 modifiers determined to be useful or relevant to the use case. In some examples, for each image generation request, the prompt modifier module 406 may select the full predefined set of prompt modifiers associated with the scoring engine 410 to enable the scoring engine 410 to predict scores for all possible prompt modifiers.

At block 510, the text encoder 408 encodes the base prompt to generate an embedding of the base prompt for use by the scoring engine 410. For example, the text of the base prompt may be encoded into a vector with a fixed length of 768. The scoring engine then processes the embedding of the base prompt to determine, for each prompt modifier, a modifier score associated with the base prompt (block 512). For example, and as mentioned above, for each possible prompt modifier that could be added to the base prompt, the scoring engine 410 predicts the difference in aesthetic score between an image generated using only the base prompt and an image generated using the combination of the base prompt and the relevant prompt modifier, and applies a penalty if the combination of the base prompt and the relevant prompt modifier is predicted to result in a reduced alignment score, thereby arriving at a final modifier score for the relevant prompt modifier. In other words, the model is, in some examples, penalized for reducing predicted alignment between the image and the prompt through the addition of one or more prompt modifiers.

In the example where 200 prompt modifiers are selected, this results in 200 modifier scores being generated. Each of those 200 modifier scores is indicative of a difference between a predicted image quality associated with using the base prompt without the respective prompt modifier and a predicted image quality associated with using the base prompt together with the respective prompt modifier, as determined by the scoring engine 410. In other words, each modifier score provides a prediction as to an expected change in an image quality score associated with use of the respective prompt modifier in the query sent to the automated image generator 404.

The prompt modifier module 406 then, at block 514, selects one or more of the prompt modifiers based on the modifier scores generated by the scoring engine 410. For example, the prompt modifier module 406 may be configured to select the prompt modifiers associated with the top 7, or top 8, modifiers scores. Scores may be filtered to select the best scores and/or only scores above a certain threshold (exceeding the threshold) may be selected. In some examples, further scoring is performed using candidate modified prompts, as will be described with reference to FIG. 8 below.

In some examples, the scoring engine 410 automatically selects the prompt modifiers with which to modify the base prompt. In other words, the scoring engine 410 may further process the results and provide output including the selected prompt modifiers.

Once the best or top scoring prompt modifiers have been selected, a modified prompt is automatically generated by the prompt augmentation system 412 based on the base prompt and the one or more selected prompt modifiers at block 516. As indicated above, in the examples described with reference to FIG. 5 to FIG. 8, the selected prompt modifiers are added to the base prompt to create the modified prompt (this may also be referred to as an augmented prompt where text objects are added to the base prompt). The prompt modifiers may be added in a predefined order (e.g., based on score and/or semantic context) or in a random order. The modified prompt may, for example, be: "closeup portrait shot of a snow viking in a scenic dystopian environment, intricate, elegant, highly detailed, centered, digital painting, concept art, smooth, sharp focus, illustration," as will be described in more detail below with reference to Tables 1 and 2.

Then, at block 518, the modified prompt is provided as input to the automated image generator 404. The automated image generator 404 uses a text-to-image machine learning model, e.g., a diffusion model, to generate an image based on the modified prompt (block 520). The generated image is then, at block 522, provided to the user, e.g., by presenting the image on the user interface provided by the interaction client 104 on the user device. Depending on the implementation, the user may be informed of the modification/s made to the original (base) prompt.

The user may utilize the generated image for various purposes, e.g., apply the generated image to a user profile or chat profile, in which case the image may be stored as part of the profile data 302. The user may also download and store the generated image in a media library or external storage component. In other examples, the user may include the image in a message sent to the user system 102 of another user of the interaction system 100, in which cases the image can be stored as part of message data in the message table 306. The generated image may be used in an augmentation process, e.g., used to augment image data or included in a content item that also includes an augmentation such as an image filter applied thereto. The method 500 concludes at closing loop block 524.

FIG. 6 is a diagram illustrating aspects of a process 600 for modifier scoring, according to some examples. The process 600 may be carried out by components of the interaction system 100, including the automated image generation system 234. In FIG. 6, the automated image generation system 234 utilizes a predefined set of one hundred prompt modifiers (which is a non-limiting example) and the scoring engine 410 is programmed to calculate a score for each prompt modifier (in association with a particular base prompt).

The text encoder 408 receives a base prompt 606 originating from a user. The deep neural network 602, e.g., providing a CLIP encoder, generates an embedding 608 of the base prompt. Then, a lightweight FFN 604 of the scoring engine 410 predicts a score for each prompt modifier. Specifically, the scoring engine 410 processes the embedding and, for each prompt modifier, the scoring engine 410 predicts a score that indicates the difference between an aesthetic image quality score for an image generated using the base prompt alone and an aesthetic image quality score for an image generated using the base prompt with the relevant prompt modifier added thereto. Further, for each prompt modifier, the scoring engine 410 predicts whether an alignment score would decrease if the relevant prompt modifier was to be added to the base prompt and used to generate the image. If so, a penalty is applied to arrive at a final modifier score. If not, the final modifier score is simply the aesthetic score difference described above.

The predicted scores 610 for each prompt modifier ("Score 1" to "Score 100") are represented by the blocks shown in FIG. 6. The highest scoring prompt modifier, or a set of the highest scoring prompt modifiers, is then added to the base prompt to obtain the modified prompt.

A modified prompt may lead to the generation of an improved image when compared to an image that would have been generated using the base prompt. As mentioned above, the improvement in quality may be assessed in a number of ways, depending on the scoring technique utilizes, e.g., aesthetic quality, alignment, reverse alignment, visual realism, or combinations thereof.

FIG. 7 is a diagram illustrating aspects of a process 700 for modifier scoring, according to some examples. The process 700 may be carried out by components of the interaction system 100, including the automated image generation system 234.

In FIG. 7, the automated image generation system 234 utilizes a predefined set of one hundred prompt modifiers (which is a non-limiting example) and the scoring engine 410 is programmed to calculate a score for each prompt modifier. However, the process 700 of FIG. 7 differs from that of FIG. 6 in that the scoring engine 410 calculates a separate aesthetic and alignment score for each prompt modifier, as indicated by the blocks representing the predicted scores 702, and does not use alignment scores to apply penalties.

The text encoder 408 receives a base prompt 606 originating from a user. The deep neural network 602 generates an embedding 608 of the base prompt. Then, the lightweight FFN 604 of the scoring engine 410 predicts a pair of scores for each prompt modifier. The scoring engine 410 processes the embedding and, for each prompt modifier, the scoring engine 410 predicts an aesthetic score that indicates the difference between an aesthetic image quality score for an image generated using the base prompt alone and an aesthetic image quality score for an image generated using the base prompt with the relevant prompt modifier added thereto. Further, for each prompt modifier, the scoring engine 410 predicts an alignment score that indicates the difference between a predicted alignment score for an image generated using the base prompt alone and a predicted alignment score for an image generated using the base prompt with the relevant prompt modifier added thereto.

The predicted scores 702 for each prompt modifier are represented by the blocks shown in FIG. 7 (e.g., for the first modifier, the scores are "AES.SCORE 1" and "ALI.SCORE 1", representing the aesthetic and alignment scores, respectively). In order to select the modifiers to add to the base prompt, a combined score may be created by combining "AES.SCORE" with "ALI.SCORE" for each modifier. For example, the two score components may be multiplied with each other, or normalized and averaged, or normalized and added together, or a predefined weighting factor may be applied. The combined scores are then compared to determine which prompt modifiers to select.

Accordingly, in some examples, a final modifier score comprises a plurality of sub-scores, each sub-score corresponding to an image quality category. These categories can include aesthetic and alignment scores, as in FIG. 7, or other categories such as reverse alignment or visual realism.

In some examples, the automated image generation system 234 iteratively generates successive candidate modified prompts, with a first candidate modified prompt being generated by adding one or more of the prompt modifiers to the base prompt based on the modifier scores associated with the base prompt, and each further candidate modified prompt being generated by adding one or more of the prompt modifiers to an immediately preceding candidate modified prompt (in the sequence of generated candidate modified prompts) based on modifier scores associated with the immediately preceding candidate modified prompt. The automated image generation system 234 may then identify a candidate modified prompt from among the plurality of candidate modified prompts as a selected prompt. The selected prompt is designated as the modified prompt to be provided to the automated image generator.

FIG. 8 is a diagram illustrating a process 800 for iterative modifier scoring, according to some examples. The process 800 may be carried out by components of the interaction system 100, including the automated image generation system 234. In FIG. 8, the automated image generation system 234 utilizes a predefined set of one hundred prompt modifiers (which is a non-limiting example) and the scoring engine 410 is programmed to calculate a score for each prompt modifier. However, the process 800 of FIG. 8 differs from those of FIG. 6 (and FIG. 7) in that an iterative scoring process is employed to arrive at the final modified prompt.

The automated image generation system 234 operates in the manner described with reference to FIG. 6 to generate a first set of predicted scores 610. From the predicted scores 610, the automated image generation system 234 automatically selects the top (e.g., highest scoring) prompt modifier. The top prompt modifier is added to the base prompt to create a candidate modified prompt. The candidate modified prompt is then fed back into the text encoder 408 as an "updated base prompt" as illustrated by the arrows 802 and 804 in FIG. 8. The updated base prompt is processed by the deep neural network 602 to obtain an embedding 806 and the embedding 806 is processed by the FFN 604. Each of the original one hundred prompt modifiers not selected to form the candidate modified prompt (in other words, the remaining 99 prompt modifiers) is then used to calculate a new score.

Specifically, the scoring engine 410 processes the embedding and, for each remaining prompt modifier, the scoring engine 410 predicts a new score that indicates the difference between an aesthetic image quality score for an image generated using the candidate modified prompt alone and an aesthetic image quality score for an image generated using the candidate modified prompt with the relevant prompt modifier added thereto. Further, for each remaining prompt modifier, the scoring engine 410 predicts whether an alignment score would decrease if the relevant prompt modifier was to be added to the candidate modified prompt and used to generate the image. If so, a penalty is applied to arrive at the final new score. If not, the final new score is simply the aesthetic score difference described above. The new predicted scores 808 are represented by the blocks shown in FIG. 8.

The automated image generation system 234 may select a further candidate modified prompt by adding the prompt modifier with the best new score to the first candidate modified prompt, and may iteratively proceed in this manner as illustrated by the arrow 810 in FIG. 8. In other words, further candidate modified prompts can be generated until, for example, a predefined number of iterations has been executed (e.g., 7 iterations to create a final modified prompt that includes the base prompt and 7 modifiers), or the automated image generation system 234 is unable to find a candidate modified prompt that would lead to an improved score (e.g., a further candidate modified prompt is only generated if there is a suitable prompt modifier to add). The automated image generation system 234 may then select the best candidate modified prompt and designate it as the selected modified prompt to provide to the automated image generator 404.

Tables 1 to 6 illustrate examples in which aesthetic and alignment scores were calculated for AI-generated images. The scores included in Tables 1 to 6 are absolute scores and not predicted score changes or predicted score differences. Aesthetic scores of the generated images were measured on a scale of 0 to 10, with 5 being regarded as a most likely score. Alignment scores of the generated images were measured on a scale of −1 to 1, with 0.3 being regarded as a most likely score. In these examples, when comparing the scores of different images, changes/differences in aesthetic values of less than 0.3 were deemed to be insignificant while changes/differences in alignment values of less than 0.02 were deemed to be insignificant.

Tables 1 and 2 below illustrate a first set of examples. Referring firstly to Table 1, a base prompt reading "portrait of a snow viking" was used, without modification, to generate two images using a text-to-image machine learning model in the example form of a diffusion model. Aesthetic and alignment scores were calculated for both images and these are included in Table 1.

TABLE 1

Aesthetic and alignment scores for images based on a first example of a base prompt

| Image | Prompt used | Aesthetic score (0-10) | Alignment score (−1 to 1) |
| --- | --- | --- | --- |
| Image 1 | portrait of a snow viking | 5.84 | 0.31 |
| Image 2 | portrait of a snow viking | 6.46 | 0.32 |

Then, the base prompt was automatically modified to generate a modified prompt: "closeup portrait shot of a snow viking in a scenic dystopian environment, intricate, elegant, highly detailed, centered, digital painting, concept art, smooth, sharp focus, illustration." The modified prompt was used to generate two images using the same model. The scores were calculated and are included in Table 2.

TABLE 2

Aesthetic and alignment scores for images based on a first example of a modified prompt

| Image | Prompt used | Aesthetic score (0-10) | Alignment score (−1 to 1) |
| --- | --- | --- | --- |
| Image 3 | closeup portrait shot of a snow viking in a scenic dystopian environment, intricate, elegant, highly detailed, centered, digital painting, concept art, smooth, sharp focus, illustration | 6.88 | 0.3 |
| Image 4 | closeup portrait shot of a snow viking in a scenic dystopian environment, intricate, elegant, highly detailed, centered, digital painting, concept art, smooth, sharp focus, illustration | 6.80 | 0.26 |

It is noted that the following prompt modifiers (text objects) were determined to be the top/best modifiers (12 in total) for the base prompt ("portrait of a snow viking"), from among a predefined set of modifiers, and thus added to the base prompt in the process:
closeup
shot
in a scenic dystopian environment
intricate
elegant
highly detailed
centered
digital painting
concept art
smooth
sharp focus
illustration Comparing the scores in Table 1 and Table 2, the modified prompt resulted in images with significantly better aesthetic quality scores. The drop in alignment for Image 3 was insignificant, while the drop in alignment for Image 4 (compared to Images 1 and 2) may be regarded as significant.

Tables 3 and 4 below illustrate a second set of examples. Referring firstly to Table 3, a base prompt reading "a rack of shoes in a room with a window" was used, without modification, to generate one image using the same diffusion model as in the first set of examples above. Aesthetic and alignment scores were calculated for the image and these are included in Table 3.

TABLE 3

Aesthetic and alignment scores for an image based on a second example of a base prompt

| Image | Prompt used | Aesthetic score (0-10) | Alignment score (-1 to 1) |
| --- | --- | --- | --- |
| Image 5 | a rack of shoes in a room with a window | 5.66 | 0.26 |

Then, the base prompt was automatically modified to generate a modified prompt: "a rack of shoes in a room with a window, impressionism." The modified prompt was used to generate an image using the same model. The scores were calculated and are included in Table 4.

TABLE 4

Aesthetic and alignment scores for an image based on a second example of a modified prompt

| Image | Prompt used | Aesthetic score (0-10) | Alignment score (-1 to 1) |
| --- | --- | --- | --- |
| Image 6 | rack of shoes in a room with a window, impressionism | 6.42 | 0.29 |

It is noted that only one prompt modifier ("impressionism") was determined to be the top/best modifier for the base prompt ("rack of shoes in a room with a window"), from among a predefined set of modifiers, and thus added to the base prompt in the process. Comparing the scores in Table 3 and Table 4, the modified prompt resulted in an image with a significantly better aesthetic quality score and a significantly better alignment score (for example, Image 6 was observed to include a window, while Image 5 did not contain a window).

Tables 5 and 6 below illustrate a third set of examples. Referring firstly to Table 5, a base prompt reading "the big ben clock tower towering over the city of London" was used, without modification, to generate one image using the same diffusion model as in the first and second set of examples. Aesthetic and alignment scores were calculated for the image and these are included in Table 5.

TABLE 5

Aesthetic and alignment scores for an image based on a third example of a base prompt

| Image | Prompt used | Aesthetic score (0-10) | Alignment score (-1 to 1) |
| --- | --- | --- | --- |
| Image 7 | the big ben clock tower towering over the city of London | 5.46 | 0.25 |

Then, the base prompt was automatically modified to generate a modified prompt: "the big ben clock tower towering over the city of London, oil on canvas." The modified prompt was used to generate an image using the same model. The scores were calculated and are included in Table 6.

TABLE 6

Aesthetic and alignment scores for images based on a third example of a modified prompt

| Image | Prompt used | Aesthetic score (0-10) | Alignment score (-1 to 1) |
| --- | --- | --- | --- |
| Image 8 | the big ben clock tower towering over the city of London, oil on canvas | 6.38 | 0.25 |

It is noted that only one prompt modifier ("oil on canvas") was determined to be the top/best modifier for the base prompt ("the big ben clock tower towering over the city of London"), from among a predefined set of modifiers, and thus added to the base prompt in the process. Comparing the scores in Table 5 and Table 6, the modified prompt resulted in an image with a significantly better aesthetic quality score and an unchanged alignment score.

Table 7 below illustrates the determination of a combined score (absolute) for a modifier in association with a given base prompt, according to some examples, where the combined score is calculated by multiplying a predicted aesthetic quality score with a predicted alignment score, and with a predicted visual realism score. For purposes of this non-limiting determination, aesthetic quality score can range between 0 and 10 (with 10 being the highest aesthetic quality score), alignment score can range between −1 and 1 (with 1 being the highest alignment score), and visual realism score can range between 0 and 1 (with 1 being the highest average visual realism score).

TABLE 7

Example of a combined score calculation

| Metric | Score as predicted by model |
| --- | --- |
| Aesthetic quality score | 5.58 |
| Alignment score | 0.33 |
| Visual realism score | 0.32 |
| Combined (final) score | 0.59 |

Machine Learning Program

Figure 9:
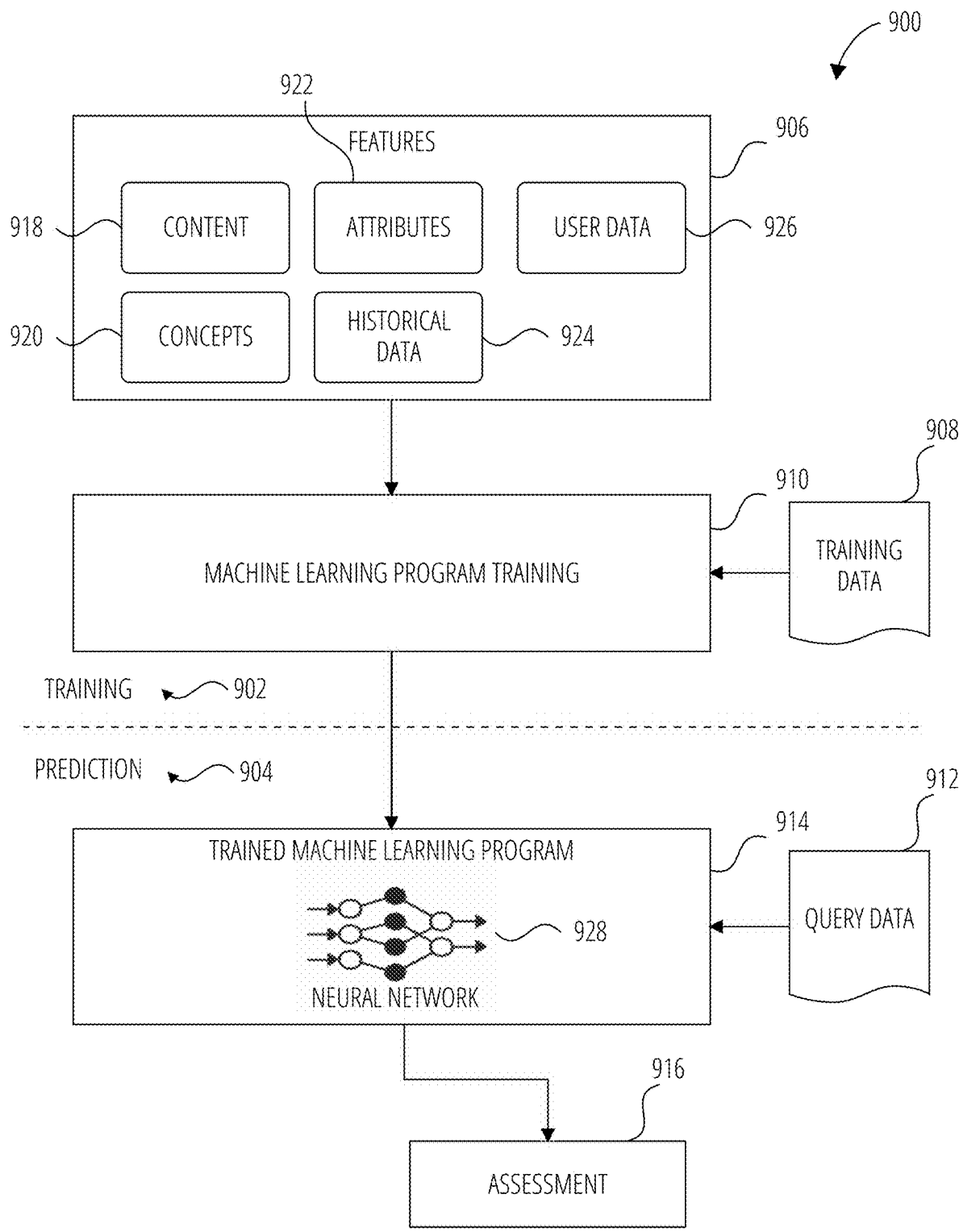
FIG. 9 is a diagrammatic illustration of training and use of a machine learning program, according to some examples.

FIG. 9 is a block diagram showing a machine learning program 900, according to some examples. The machine learning programs 900, also referred to as machine learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 908 in order to make data-driven predictions or decisions expressed as outputs or assessments (e.g., assessment 916). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 900 supports two types of phases, namely training phases 902 and prediction phases 904. In training phases 902, supervised learning, unsupervised or reinforcement learning may be used. For example, the machine learning program 900 (1) receives features 906 (e.g., as structured or labeled data in supervised learning) and/or (2) identifies features 906 (e.g., unstructured or unlabeled data for unsupervised learning) in training data 908. In prediction phases 904, the machine learning program 900 uses the features 906 for analyzing query data 912 to generate outcomes or predictions, as examples of an assessment 916.

In the training phase 902, feature engineering is used to identify features 906 and may include identifying informative, discriminating, and independent features for the effective operation of the machine learning program 900 in pattern recognition, classification, and regression. In some examples, the training data 908 includes labeled data, which is known data for pre-identified features 906 and one or more outcomes. Each of the features 906 may be a variable or attribute, such as individual measurable property of a process, article, system, or phenomenon represented by a dataset (e.g., the training data 908). Features 906 may also be of different types, such as numeric features, strings, and graphs, and may include one or more of content 918, concepts 920, attributes 922, historical data 924 and/or user data 926, merely for example.

The concept of a feature in this context is related to that of an explanatory variable used in statistical techniques such as linear regression. Choosing informative, discriminating, and independent features is important for the effective operation of the machine learning program 900 in pattern recognition, classification, and regression. Features may be of different types, such as numeric features, strings, and graphs.

In training phases 902, the machine learning program 900 uses the training data 908 to find correlations among the features 906 that affect a predicted outcome or assessment 916.

With the training data 908 and the identified features 906, the machine learning program 900 is trained during the training phase 902 at machine learning program training 910. The machine learning program 900 appraises values of the features 906 as they correlate to the training data 908. The result of the training is the trained machine learning program 914 (e.g., a trained or learned model).

Further, the training phases 902 may involve machine learning, in which the training data 908 is structured (e.g., labeled during preprocessing operations), and the trained machine learning program 914 implements a relatively simple neural network 928 capable of performing, for example, classification and clustering operations. In other examples, the training phase 902 may involve deep learning, in which the training data 908 is unstructured, and the trained machine learning program 914 implements a deep neural network 928 that is able to perform both feature extraction and classification/clustering operations.

A neural network 928 generated during the training phase 902, and implemented within the trained machine learning program 914, may include a hierarchical (e.g., layered) organization of neurons. For example, neurons (or nodes) may be arranged hierarchically into a number of layers, including an input layer, an output layer, and multiple hidden layers. Each of the layers within the neural network 928 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 928 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), a Recursive Neural Network (RNN), a VAE, a GAN, or an autoregressive model, merely for example.

During prediction phases 904, the trained machine learning program 914 is used to perform an assessment. Query data 912 is provided as an input to the trained machine learning program 914, and the trained machine learning program 914 generates the assessment 916 as output, responsive to receipt of the query data 912.

In some examples, a trained machine learning program 914 can be used for automated image generation as described in the present disclosure. Automated image generation, and specifically text-guided AI-driven image generation, can be achieved using different types of machine learning programs (or models). As mentioned elsewhere, examples of these include VAEs, GANs, autoregressive models, and diffusion models.

A VAE is an unsupervised machine learning program that generates an image by processing a text prompt and mapping it to a latent space representation. The latest space representation may then be used to generate an image that corresponds to the text prompt. VAEs are designed to learn the distribution of a dataset and apply that to generate new images likely to conform more closely to the dataset.

A GAN is a generative model that comprises a generator and a discriminator. The generator may generate images based on text prompts, and the discriminator may evaluate the generated images for realism and/or other metrics, depending on the implementation. The generator and discriminator are trained simultaneously to generate images aimed at closely matching the input text prompt. The generator generates an image that is intended to deceive the discriminator into designating the image as "real," while the discriminator generates an image to evaluate the realism of the generator's output. In this way, both networks can be optimized towards their objectives and improve the quality of the generated images.

Autoregressive models generate images pixel by pixel, where each pixel is generated based on the previous pixels. Autoregressive models may be trained, for example, using maximum likelihood estimation (MLE) to learn the conditional probability distribution of each pixel in an image given its previous pixels.

Diffusion models, as described in greater detail above, are generative models that generate images by diffusing noise over time. The program may take in a text prompt and generate a noise vector, which is then diffused over a set number of time steps to generate an image.

In some examples, a diffusion-based model may also take an image as an input to produce a generated image that is conditioned on the input image and the relevant text. In this way, an AI-generated image can be seeded with an initial image such as a drawing or photograph, with the model being instructed to build or generate a new image on top of, or conditioned on, the input image, e.g., to preserve a general shape or layout of the input image. While a text-to-image diffusion technique that does not utilize an input image may commence the diffusion process with pure noise and progressively refine the generated image, using an input image may allow for some earlier steps to be skipped, e.g., by commencing with the input image mixed with Gaussian noise.

Data Communications Architecture

Figure 10:
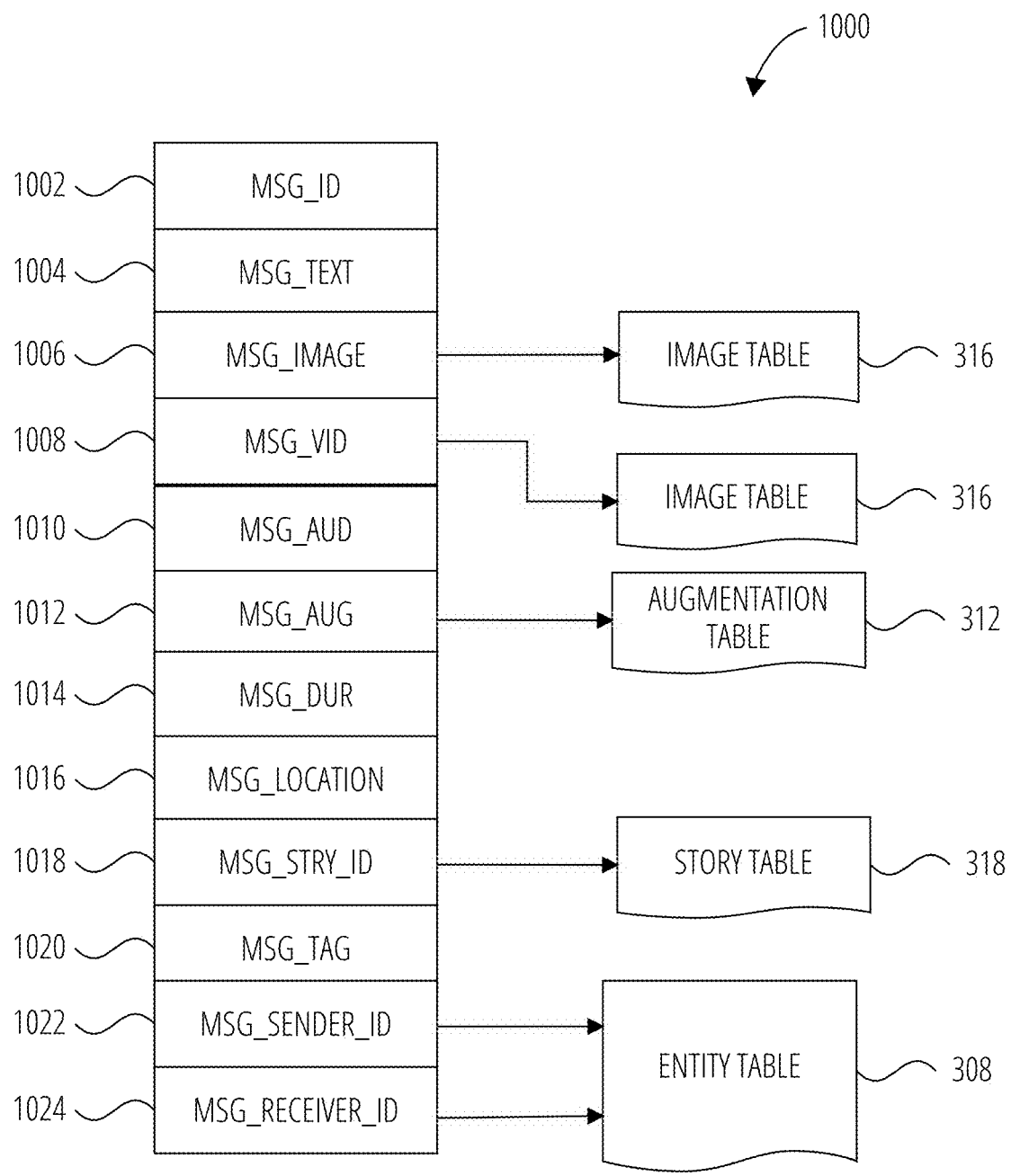
FIG. 10 is a diagrammatic representation of a message, according to some examples.

FIG. 10 is a schematic diagram illustrating a structure of a message 1000, according to some examples, generated by an interaction client 104 for communication to a further interaction client 104 via the interaction servers 124. The content of a particular message 1000 is used to populate the message table 306 stored within the database 304, accessible by the interaction servers 124. Similarly, the content of a message 1000 is stored in memory as "in-transit" or "in-flight" data of the user system 102 or the interaction servers 124. A message 1000 is shown to include the following example components:

Message identifier 1002: a unique identifier that identifies the message 1000.

Message text payload 1004: text, to be generated by a user via a user interface of the user system 102, and that is included in the message 1000.

Message image payload 1006: image data, captured by a camera component of a user system 102 or retrieved from a memory component of a user system 102, and that is included in the message 1000. Image data for a sent or received message 1000 may be stored in the image table 316.

Message video payload 1008: video data, captured by a camera component or retrieved from a memory component of the user system 102, and that is included in the message 1000. Video data for a sent or received message 1000 may be stored in the image table 316.

Message audio payload 1010: audio data, captured by a microphone or retrieved from a memory component of the user system 102, and that is included in the message 1000.

Message augmentation data 1012: augmentation data (e.g., filters, stickers, or other annotations or enhancements) that represents augmentations to be applied to message image payload 1006, message video payload 1008, or message audio payload 1010 of the message 1000. Augmentation data for a sent or received message 1000 may be stored in the augmentation table 312.

Message duration parameter 1014: parameter value indicating, in seconds, the amount of time for which content of the message (e.g., the message image payload 1006, message video payload 1008, message audio payload 1010) is to be presented or made accessible to a user via the interaction client 104.

Message geolocation parameter 1016: geolocation data (e.g., latitudinal and longitudinal coordinates) associated with the content payload of the message. Multiple message geolocation parameter 1016 values may be included in the payload, each of these parameter values being associated with respect to content items included in the content (e.g., a specific image within the message image payload 1006, or a specific video in the message video payload 1008).

Message story identifier 1018: identifier values identifying one or more content collections (e.g., "stories" identified in the story table 318) with which a particular content item in the message image payload 1006 of the message 1000 is associated. For example, multiple images within the message image payload 1006 may each be associated with multiple content collections using identifier values.

Message tag 1020: each message 1000 may be tagged with multiple tags, each of which is indicative of the subject matter of content included in the message payload. For example, where a particular image included in the message image payload 1006 depicts an animal (e.g., a lion), a tag value may be included within the message tag 1020 that is indicative of the relevant animal. Tag values may be generated manually, based on user input, or may be automatically generated using, for example, image recognition.

Message sender identifier 1022: an identifier (e.g., a messaging system identifier, email address, or device identifier) indicative of a user of the user system 102 on which the message 1000 was generated and from which the message 1000 was sent.

Message receiver identifier 1024: an identifier (e.g., a messaging system identifier, email address, or device identifier) indicative of a user of the user system 102 to which the message 1000 is addressed.

The contents (e.g., values) of the various components of message 1000 may be pointers to locations in tables within which content data values are stored. For example, an image value in the message image payload 1006 may be a pointer to (or address of) a location within an image table 316. Similarly, values within the message video payload 1008 may point to data stored within an image table 316, values stored within the message augmentation data 1012 may point to data stored in an augmentation table 312, values stored within the message story identifier 1018 may point to data stored in a story table 318, and values stored within the message sender identifier 1022 and the message receiver identifier 1024 may point to user records stored within an entity table 308.

System with Head-Wearable Apparatus

Figure 11:
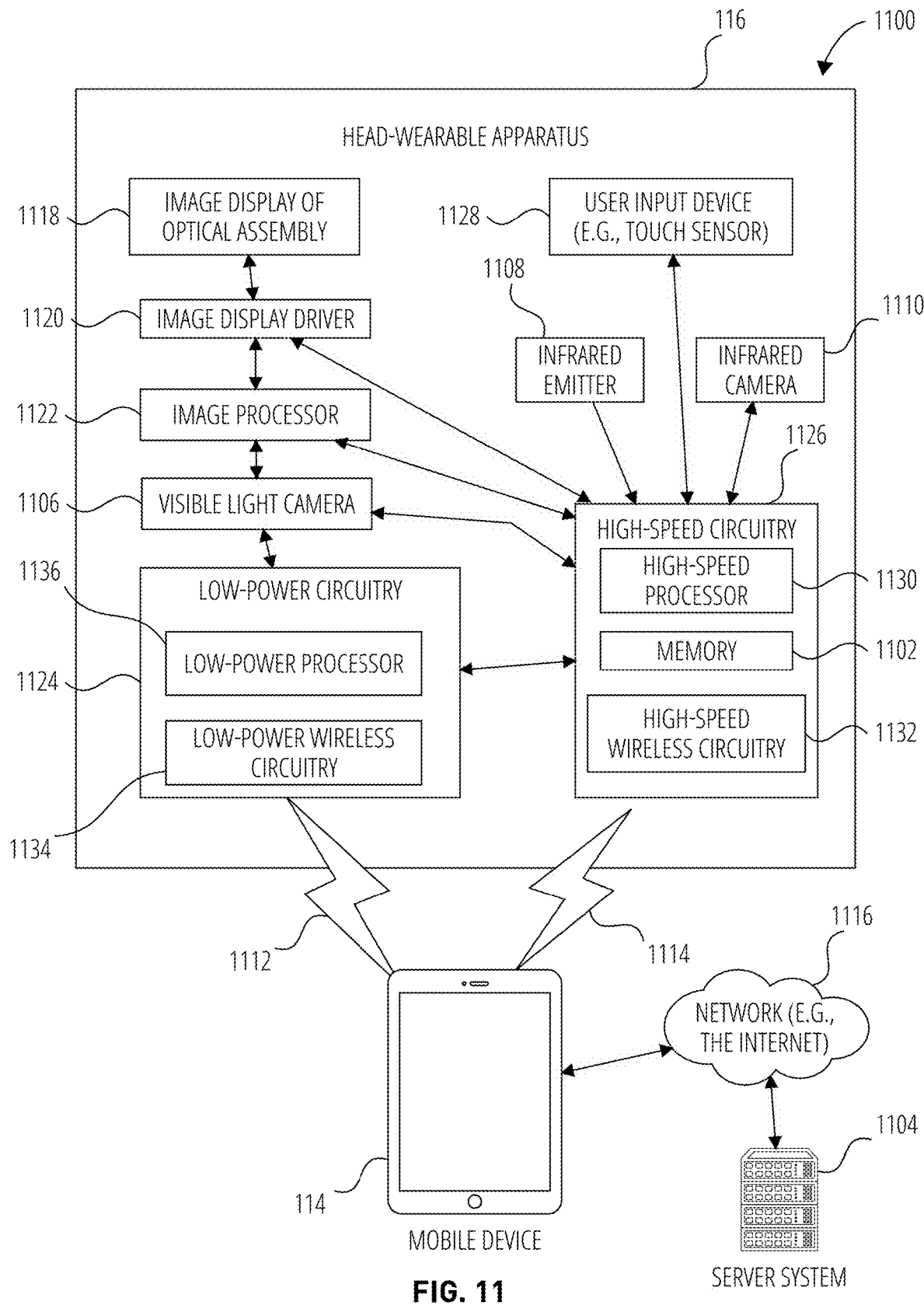
FIG. 11 is a diagrammatic representation of a system including a head-wearable apparatus, according to some examples.

FIG. 11 illustrates a system 1100 including a head-wearable apparatus 116 with a selector input device, according to some examples. FIG. 11 is a high-level functional block diagram of an example head-wearable apparatus 116 communicatively coupled to a mobile device 114 and various server systems 1104 (e.g., the interaction server system 110) via various networks 108.

The head-wearable apparatus 116 includes one or more cameras, each of which may be, for example, a visible light camera 1106, an infrared emitter 1108, and an infrared camera 1110.

The mobile device 114 connects with head-wearable apparatus 116 using both a low-power wireless connection 1112 and a high-speed wireless connection 1114. The mobile device 114 is also connected to the server system 1104 and the network 1116.

The head-wearable apparatus 116 further includes two image displays of the image display of optical assembly 1118. The two image displays of optical assembly 1118 include one associated with the left lateral side and one associated with the right lateral side of the head-wearable apparatus 116. The head-wearable apparatus 116 also includes an image display driver 1120, an image processor 1122, low-power circuitry 1124, and high-speed circuitry 1126. The image display of optical assembly 1118 is for presenting images and videos, including an image that can include a graphical user interface to a user of the head-wearable apparatus 116.

The image display driver 1120 commands and controls the image display of optical assembly 1118. The image display driver 1120 may deliver image data directly to the image display of optical assembly 1118 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1128 (e.g., touch sensor or push button), including an input surface on the head-wearable apparatus 116. The user input device 1128 (e.g., touch sensor or push button) is to receive from the user an input selection to manipulate the graphical user interface of the presented image.

The components shown in FIG. 11 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1106 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1102, which stores instructions to perform a subset or all of the functions described herein. The memory 1102 can also include a storage device.

As shown in FIG. 11, the high-speed circuitry 1126 includes a high-speed processor 1130, a memory 1102, and high-speed wireless circuitry 1132. In some examples, the image display driver 1120 is coupled to the high-speed circuitry 1126 and operated by the high-speed processor 1130 in order to drive the left and right image displays of the image display of optical assembly 1118. The high-speed processor 1130 may be any processor capable of managing high-speed communications and operation of any general computing system needed for the head-wearable apparatus 116. The high-speed processor 1130 includes processing resources needed for managing high-speed data transfers on a high-speed wireless connection 1114 to a wireless local area network (WLAN) using the high-speed wireless circuitry 1132. In certain examples, the high-speed processor 1130 executes an operating system such as a LINUX operating system or other such operating system of the head-wearable apparatus 116, and the operating system is stored in the memory 1102 for execution. In addition to any other responsibilities, the high-speed processor 1130 executing a software architecture for the head-wearable apparatus 116 is used to manage data transfers with high-speed wireless circuitry 1132. In certain examples, the high-speed wireless circuitry 1132 is configured to implement Institute of Electrical and Electronic Engineers (IEEE) 802.11 communication standards, also referred to herein as WiFi. In some examples, other high-speed communications standards may be implemented by the high-speed wireless circuitry 1132.

The low-power wireless circuitry 1134 and the high-speed wireless circuitry 1132 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1112 and the high-speed wireless connection 1114, may be implemented using details of the architecture of the head-wearable apparatus 116, as can other elements of the network 1116.

The memory 1102 includes any storage device capable of storing various data and applications, including, among other things, camera data generated by the left and right visible light cameras 1106, the infrared camera 1110, and the image processor 1122, as well as images generated for display by the image display driver 1120 on the image displays of the image display of optical assembly 1118. While the memory 1102 is shown as integrated with high-speed circuitry 1126, in some examples, the memory 1102 may be an independent standalone element of the head-wearable apparatus 116. In certain such examples, electrical routing lines may provide a connection through a chip that includes the high-speed processor 1130 from the image processor 1122 or the low-power processor 1136 to the memory 1102. In some examples, the high-speed processor 1130 may manage addressing of the memory 1102 such that the low-power processor 1136 will boot the high-speed processor 1130 any time that a read or write operation involving memory 1102 is needed.

As shown in FIG. 11, the low-power processor 1136 or high-speed processor 1130 of the head-wearable apparatus 116 can be coupled to the camera (visible light camera 1106, infrared emitter 1108, or infrared camera 1110), the image display driver 1120, the user input device 1128 (e.g., touch sensor or push button), and the memory 1102.

The head-wearable apparatus 116 is connected to a host computer. For example, the head-wearable apparatus 116 is paired with the mobile device 114 via the high-speed wireless connection 1114 or connected to the server system 1104 via the network 1116. The server system 1104 may be one or more computing devices as part of a service or network computing system, for example, that includes a processor, a memory, and network communication interface to communicate over the network 1116 with the mobile device 114 and the head-wearable apparatus 116.

The mobile device 114 includes a processor and a network communication interface coupled to the processor. The network communication interface allows for communication over the network 1116, low-power wireless connection 1112, or high-speed wireless connection 1114. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1120. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1104, such as the user input device 1128, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1112 and high-speed wireless connection 1114 from the mobile device 114 via the low-power wireless circuitry 1134 or high-speed wireless circuitry 1132.

Machine Architecture

Figure 12:
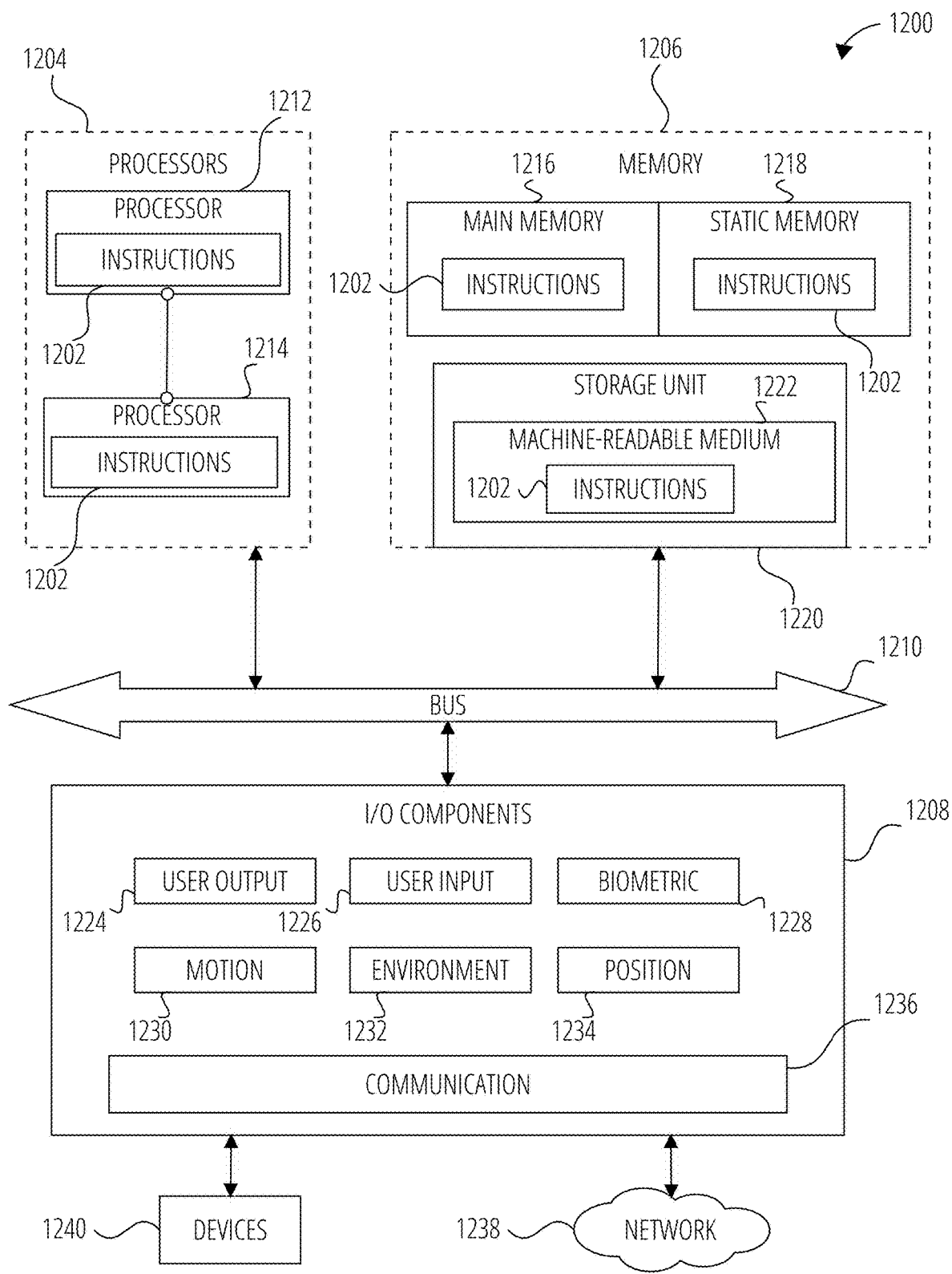
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. The machine 1200, for example, may comprise the user system 102 or any one of multiple server devices forming part of the interaction server system 110. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., hypertext transfer protocol (HTTP)). Similarly, the instructions 1202 may be transmitted or received using a transmission medium via a coupling (e.g., a peer-to-peer coupling) to the devices 1240.

Software Architecture

Figure 13:
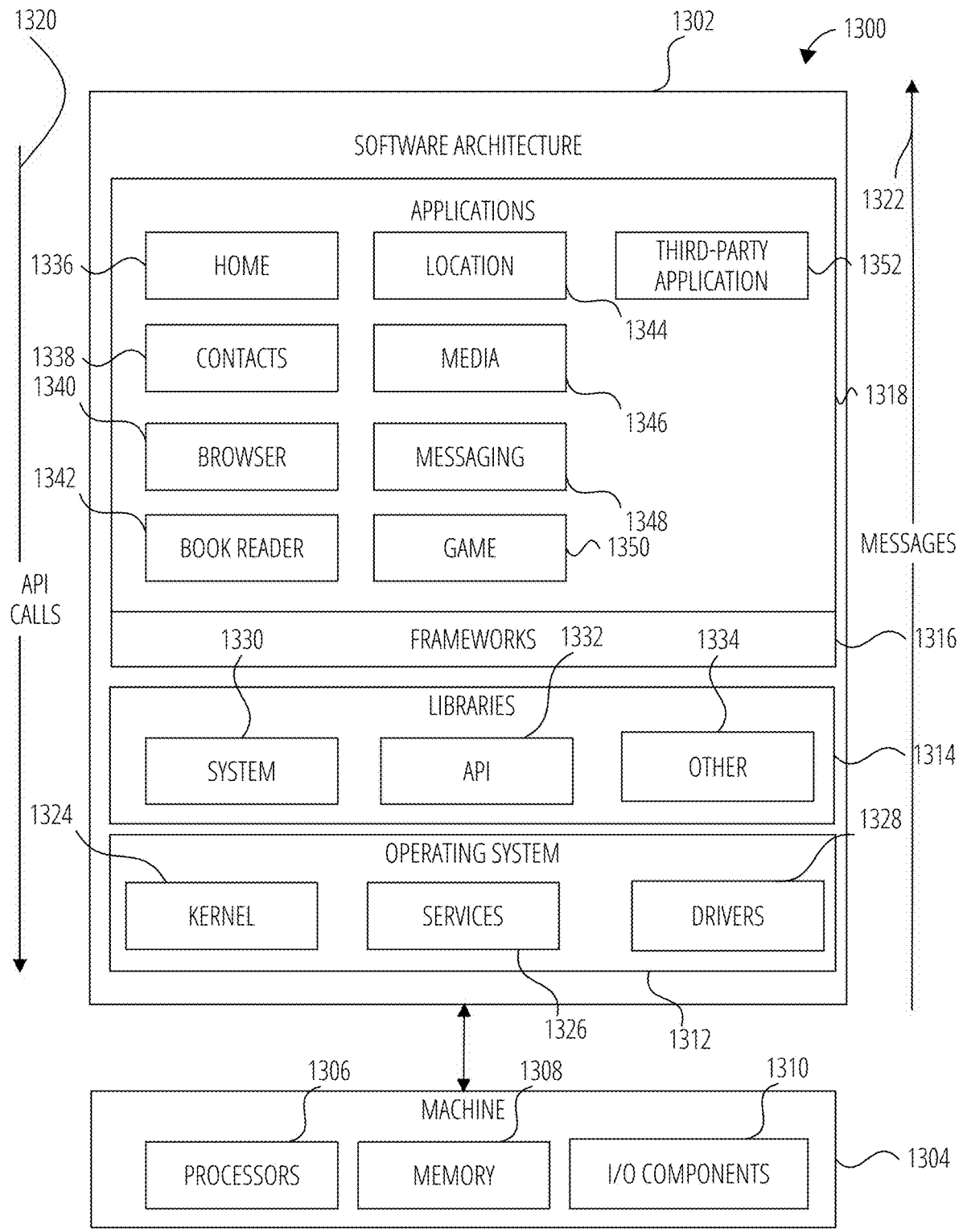
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a contacts application 1338, a browser application 1340, a book reader application 1342, a location application 1344, a media application 1346, a messaging application 1348, a game application 1350, and a broad assortment of other applications such as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1352 can invoke the API calls 1320 provided by the operating system 1312 to facilitate functionalities described herein.

CONCLUSION

Examples of the present disclosure thus allow users to receive high-quality, automatically generated images using an automated image generator, without requiring sophisticated prompt engineering skills. A technical hurdle to the generation of quality images may be addressed or alleviated by automatically augmenting or modifying prompts as described herein. Prompts may be modified by predicting, using a trained neural network, various modifier scores associated with image quality or changes in image quality likely to be obtained through employment of respective prompt modifiers. Systems and methods according to examples herein may automatically encode an input prompt, predict such scores, modify the input prompt based on the scores, and cause automatic generation of an image in response to the prompt.

When the effects in this disclosure are considered in aggregate, one or more of the methodologies described herein may improve image quality or obviate a need for certain efforts or resources that otherwise would be involved in automated image generation. Computing resources used by one or more machines, databases, or networks may be more efficiently utilized or even reduced, e.g., as a result of a user not having to manually modify and re-submit prompts in an attempt to obtain better images or images that are more closely aligned to what the user has in mind. Examples of such computing resources may include processor cycles, network traffic, memory usage, graphics processing unit (GPU) resources, data storage capacity, power consumption, and cooling capacity.

Examples described herein refer to embeddings. An embedding is a mathematical representation of a feature or input data that allows it to be processed by, or facilitates processing thereof, by a machine learning algorithm. In some examples, an embedding is a mapping of high-dimensional input data to a lower-dimensional space, where the data can be more easily processed. It should be appreciated that, in some examples, where references are made to encoding text, e.g., creating embeddings, pre-processing steps may be carried out automatically (or in some cases manually) prior to such encoding. This may include pre-processing actions such as removing stop words, stemming, or lowercasing.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled or owned by a user and with which the user interacts to perform an action, or an interaction with other users or computer systems.

What is claimed is:

1. A method comprising:
receiving, from a user device, an image generation request comprising a base prompt;
identifying a plurality of prompt modifiers by accessing, from storage, a predefined set of prompt modifiers associated with modifier scoring;
generating an embedding of the base prompt;
automatically determining, for each prompt modifier of the plurality of prompt modifiers, a modifier score associated with the base prompt by processing the embedding of the base prompt;
automatically selecting one or more of the plurality of prompt modifiers based on the modifier scores;
automatically generating a modified prompt based on the base prompt and the one or more selected prompt modifiers, the modified prompt being provided as input to an automated image generator to generate an image; and
causing presentation of the image on the user device.

2. The method of claim 1, wherein the base prompt comprises a first set of text objects, and wherein the modified prompt comprises the first set of text objects and a second set of text objects.

3. The method of claim 1, wherein the base prompt is a text prompt and the one or more selected prompt modifiers comprises one or more text objects to be added to the base prompt.

4. The method of claim 1, wherein the base prompt is encoded by a processor-implemented text encoder to generate the embedding of the base prompt.

5. The method of claim 4, wherein the processor-implemented text encoder comprises a transformer-based deep neural network, the deep neural network being trained to generate, in response to receiving a given text input, an embedding that comprises a fixed-length vector representing a meaning of the given text input.

6. The method of claim 1, wherein a processor-implemented scoring engine is associated with the predefined set of prompt modifiers and generates the modifier scores, the processor-implemented scoring engine comprising a feed-forward neural network (FFN), the FFN being trained to generate modifier scores for a given text input in response to receiving an embedding corresponding to the given text input.

7. The method of claim 1, wherein the automated image generator comprises a text-to-image machine learning model.

8. The method of claim 7, wherein the text-to-image machine learning model is a diffusion model.

9. The method of claim 1, wherein the selecting one or more of the plurality of prompt modifiers comprises, for each prompt modifier of the plurality of prompt modifiers, selecting the prompt modifier if the modifier score exceeds a threshold.

10. The method of claim 1, wherein the generating the modified prompt comprises adding the one or more selected prompt modifiers to the base prompt to define the modified prompt.

11. The method of claim 1, further comprising, prior to the generating of the modified prompt:
iteratively generating successive candidate modified prompts, a first candidate modified prompt being generated by adding one or more of the plurality of prompt modifiers to the base prompt based on the modifier scores associated with the base prompt, and each further candidate modified prompt being generated by adding one or more of the plurality of prompt modifiers to an immediately preceding candidate modified prompt based on modifier scores associated with the immediately preceding candidate modified prompt.

12. The method of claim 11, further comprising, prior to the generating of the modified prompt:
identifying a candidate modified prompt from among the candidate modified prompts as a selected prompt, wherein the generating the modified prompt comprises designating the selected prompt as the modified prompt to be provided to the automated image generator.

13. The method of claim 11, further comprising, for each candidate modified prompt:
encoding, by a text encoder, the candidate modified prompt to generate an embedding of the candidate modified prompt, wherein the embedding of the candidate modified prompt is processed to determine modifier scores for one or more prompt modifiers associated with the candidate modified prompt.

14. The method of claim 1, wherein, for each prompt modifier of the plurality of prompt modifiers, the modifier score associated with the base prompt is indicative of a difference between a predicted image quality associated with using the base prompt without the prompt modifier and a predicted image quality associated with using the base prompt together with the prompt modifier.

15. The method of claim 1, wherein, for each prompt modifier of the plurality of prompt modifiers, the modifier score is indicative of a predicted change in an image quality score associated with use of the prompt modifier.

16. The method of claim 15, wherein the modifier score comprises a plurality of sub-scores, each sub-score corresponding to an image quality category, the image quality categories including at least one of: aesthetic quality; alignment; reverse alignment; or visual realism.

17. The method of claim 1, wherein the receiving of the image generation request comprises:
causing presentation of an input text box in a user interface provided by an interaction client executing on the user device; and
receiving user input comprising the base prompt via the input text box in the user interface, wherein the causing presentation of the image on the user device comprises causing presentation of the image in the user interface provided by the interaction client.

18. A computing apparatus including at least one processor and a memory storing instructions configured such that, when executed in cooperation with controlling the at least one processor, the instructions operate the computing apparatus to perform operations comprising:
receiving an image generation request comprising a base prompt;
identifying a plurality of prompt modifiers by accessing, from storage, a predefined set of prompt modifiers associated with modifier scoring;
generating an embedding of the base prompt;
automatically determining, for each prompt modifier of the plurality of prompt modifiers, a modifier score associated with the base prompt by processing the embedding of the base prompt;
automatically selecting one or more of the plurality of prompt modifiers based on the modifier scores;
automatically generating a modified prompt based on the base prompt and the one or more selected prompt modifiers, the modified prompt being provided as input to an automated image generator to generate an image; and causing presentation of the image.

19. A non-transitory computer-readable storage medium, the computer-readable storage medium including instructions that when executed by at least one computer, cause the least one computer to perform operations comprising:

receiving an image generation request comprising a base prompt;

identifying a plurality of prompt modifiers by accessing, from storage, a predefined set of prompt modifiers associated with modifier scoring;

generating an embedding of the base prompt;

automatically determining, for each prompt modifier of the plurality of prompt modifiers, a modifier score associated with the base prompt by processing the embedding of the base prompt;

automatically selecting one or more of the plurality of prompt modifiers based on the modifier scores;

automatically generating a modified prompt based on the base prompt and the one or more selected prompt modifiers, the modified prompt being provided as input to an automated image generator to generate an image; and causing presentation of the image.

20. The computing apparatus of claim 18, wherein the base prompt comprises a first set of text objects, and wherein the modified prompt comprises the first set of text objects and a second set of text objects.

\* \* \* \* \*